(12) United States Patent
Hirano et al.

(10) Patent No.: US 8,813,159 B2
(45) Date of Patent: Aug. 19, 2014

(54) DATA TRANSMISSION DEVICE AND DATA TRANSMISSION CONTROL DEVICE

(75) Inventors: Jun Hirano, Osaka (JP); Kouichi Masuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/885,464

(22) PCT Filed: Nov. 25, 2011

(86) PCT No.: PCT/JP2011/006559
§ 371 (c)(1),
(2), (4) Date: May 15, 2013

(87) PCT Pub. No.: WO2012/081170
PCT Pub. Date: Jun. 21, 2012

(65) Prior Publication Data
US 2013/0232536 A1 Sep. 5, 2013

(30) Foreign Application Priority Data
Dec. 17, 2010 (JP) ................................. 2010-282199

(51) Int. Cl.
| | | |
|---|---|---|
| H04N 7/173 | (2011.01) | |
| H04N 5/222 | (2006.01) | |
| H04L 29/06 | (2006.01) | |
| H04N 21/2343 | (2011.01) | |
| H04H 20/18 | (2008.01) | |
| H04N 21/61 | (2011.01) | |
| H04N 21/2365 | (2011.01) | |
| H04N 21/6587 | (2011.01) | |
| H04N 21/2187 | (2011.01) | |
| H04H 20/10 | (2008.01) | |
| H04H 20/42 | (2008.01) | |
| H04H 60/12 | (2008.01) | |
| H04H 60/05 | (2008.01) | |
| H04H 20/04 | (2008.01) | |

(52) U.S. Cl.
CPC .......... *H04N 21/6156* (2013.01); *H04H 60/12* (2013.01); *H04L 65/80* (2013.01); *H04H 60/05* (2013.01); *H04N 21/23439* (2013.01); *H04H 20/18* (2013.01); *H04H 20/04* (2013.01); *H04N 21/2365* (2013.01); *H04N 21/6587* (2013.01); *H04L 65/4007* (2013.01); *H04N 21/2187* (2013.01); *H04H 20/103* (2013.01); *H04H 20/42* (2013.01)
USPC .......................................... 725/119; 348/722

(58) Field of Classification Search
None
See application file for complete search history.

(56) References Cited

U.S. PATENT DOCUMENTS

| | | | |
|---|---|---|---|
| 5,818,911 A | 10/1998 | Kawashima | |
| 7,088,741 B2 | 8/2006 | Kobayashi | |
| 2002/0109710 A1* | 8/2002 | Holtz et al. .................... | 345/723 |
| 2002/0118302 A1* | 8/2002 | Iizuka et al. .................. | 348/578 |
| 2002/0126226 A1* | 9/2002 | Dudkowski ................... | 348/722 |
| 2003/0058934 A1 | 3/2003 | Koto | |
| 2003/0189589 A1* | 10/2003 | LeBlanc et al. ............... | 345/723 |
| 2005/0094562 A1 | 5/2005 | Roy | |
| 2007/0182864 A1* | 8/2007 | Stoneham et al. ............ | 348/722 |
| 2009/0187826 A1* | 7/2009 | Heimbold et al. ............ | 715/719 |
| 2009/0284662 A1 | 11/2009 | Ramaswamy | |
| 2010/0110295 A1* | 5/2010 | Saijo ............................. | 348/565 |
| 2010/0118162 A1* | 5/2010 | Saijo .......................... | 348/231.6 |

FOREIGN PATENT DOCUMENTS

| | | |
|---|---|---|
| EP | 1 971 142 A1 | 9/2008 |
| JP | 08-32534 A | 2/1996 |
| JP | 08-228340 A | 9/1996 |
| JP | 2004-350266 A | 12/2004 |
| JP | 2005-340973 A | 12/2005 |

OTHER PUBLICATIONS

International Search Report for PCT/JP2011/006559 dated Dec. 20, 2011.
Extended European Search Report issued in Application No. EP 11 84 8397 dated Apr. 14, 2014.

* cited by examiner

Primary Examiner — Nathan Flynn
Assistant Examiner — William J Kim
(74) *Attorney, Agent, or Firm* — Pearne & Gordon LLP

(57) ABSTRACT

Disclosed is a technique for effectively transmitting a plurality of contents under the situation securing minimum QoS. According to the technique, among a plurality of contents to be transmitted to a data reception device, two or more contents are set as main contents, and the remaining contents are set as stand-by contents. One of the two or more main contents is set as a broadcasting content to be broadcasted actually, and the remaining main content is set as a switching content. The data transmission device transmits the two main contents to the data reception device via a high-quality line (main content line) and transmits the remaining stand-by contents via a line of a quality lower than the main content line (proxy data transmission line). Contents are switched by interchanging between a broadcasting content and a switching content and interchanging between a switching content and a stand-by content.

18 Claims, 20 Drawing Sheets

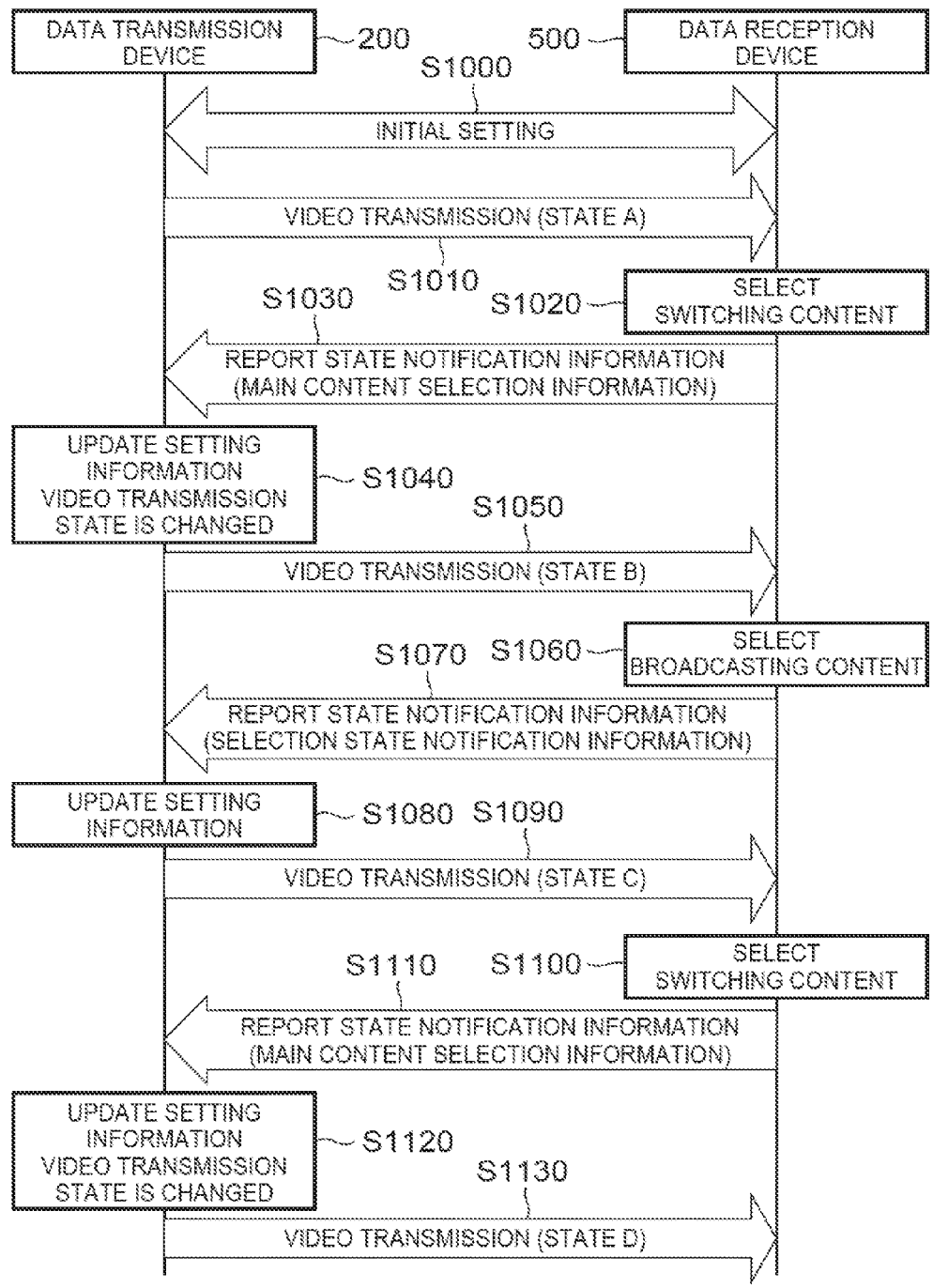

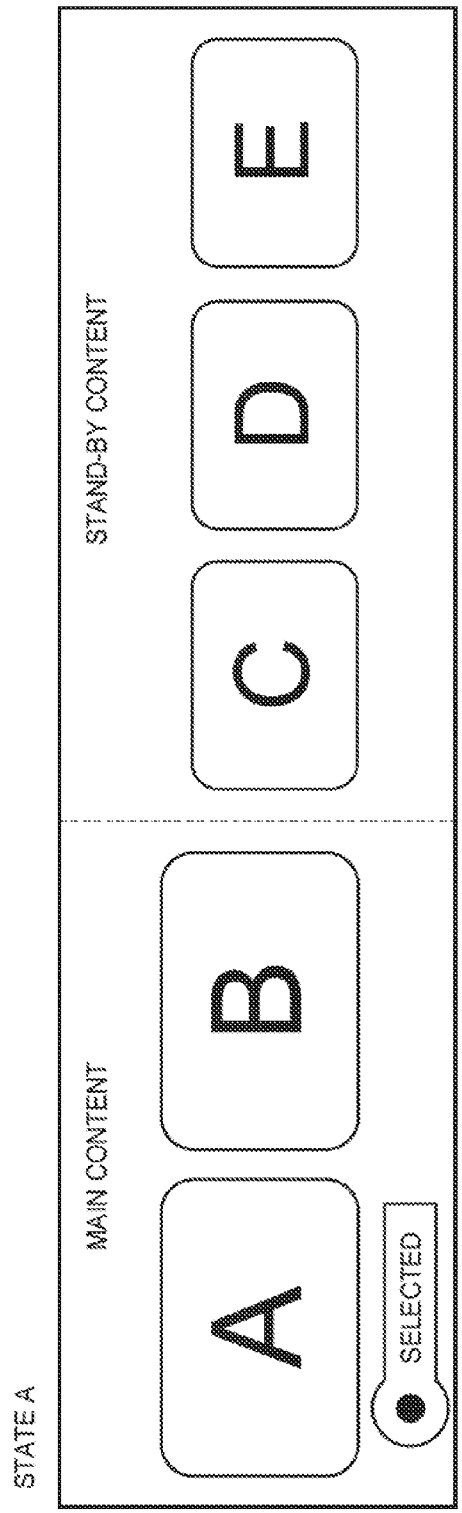

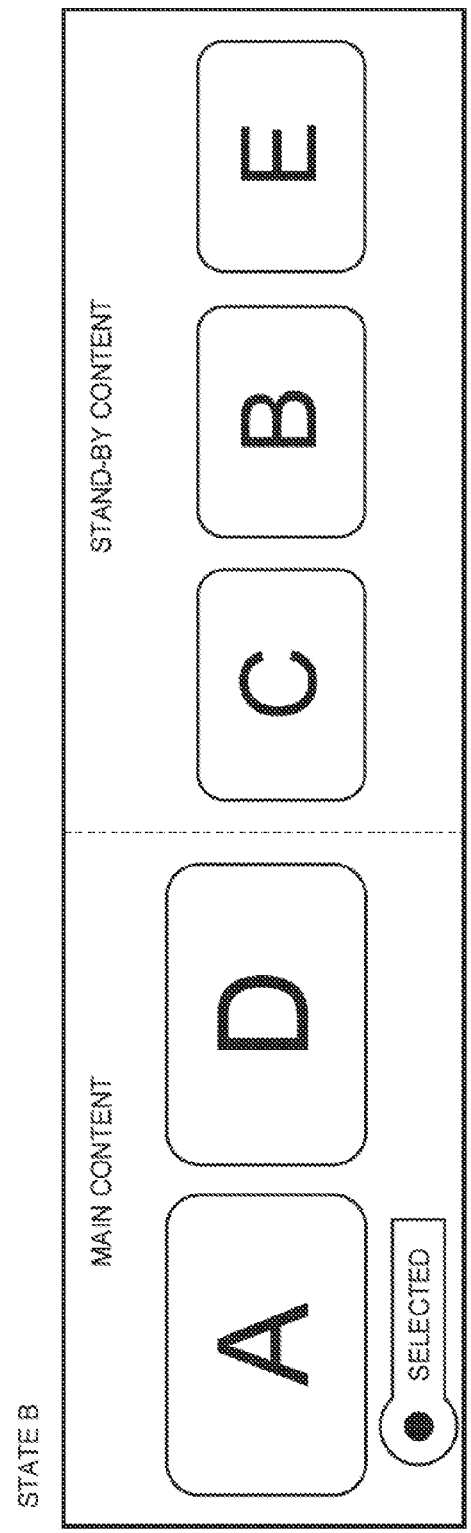

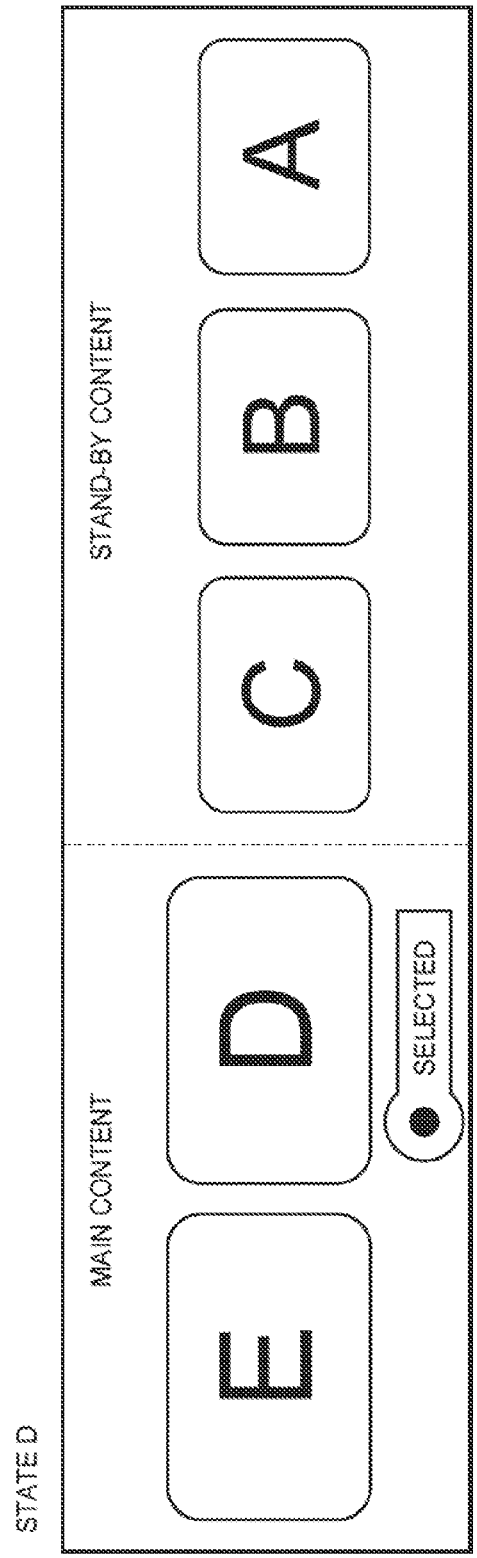

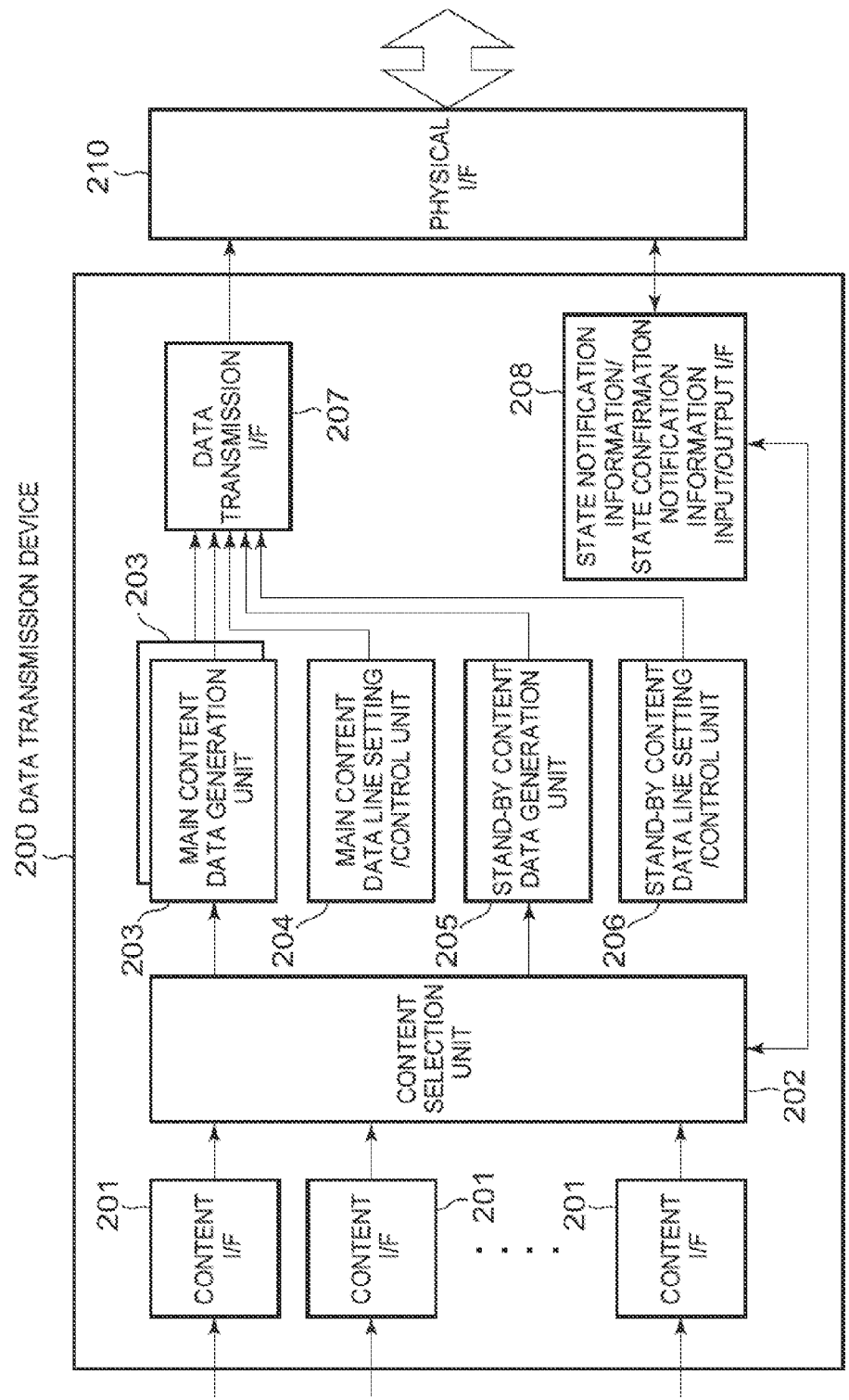

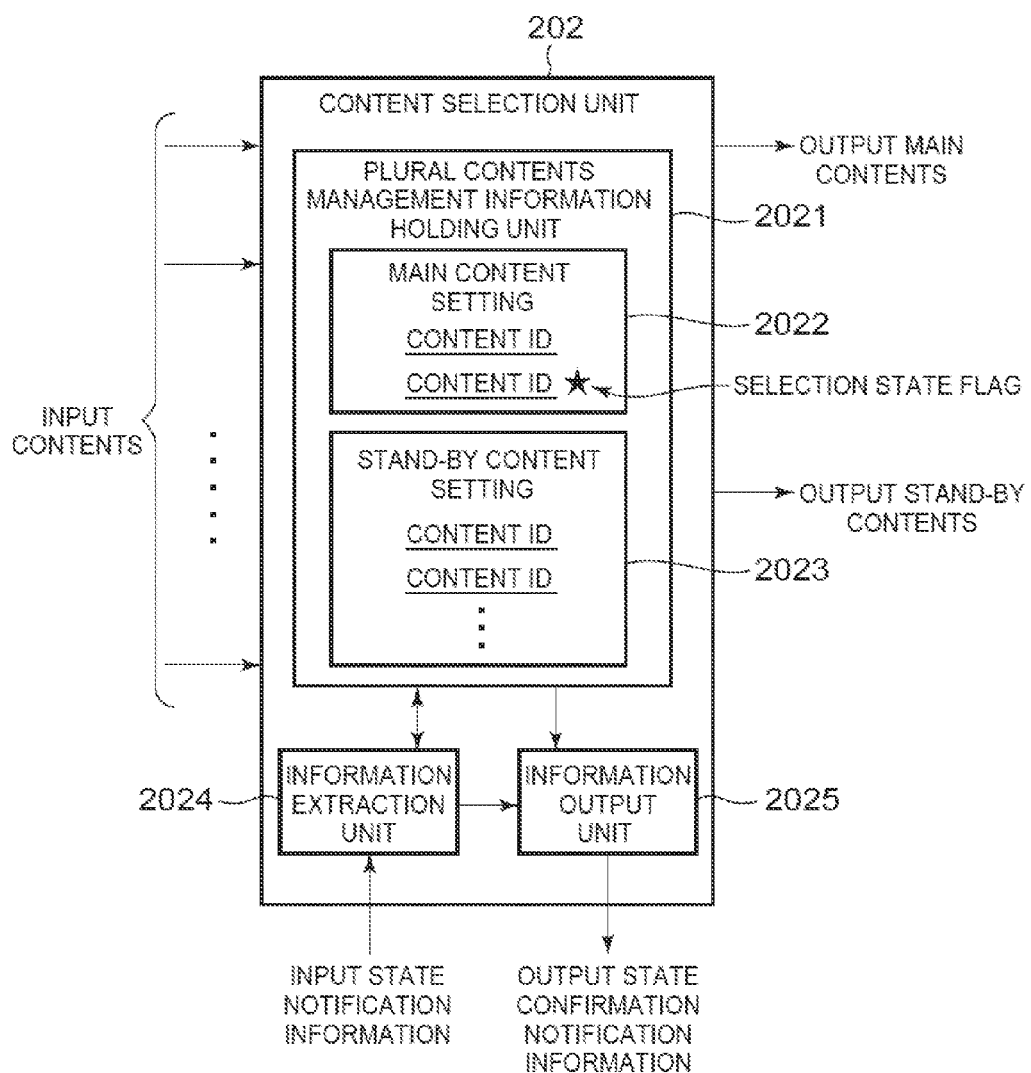

DATA TRANSMISSION DEVICE AND DATA TRANSMISSION CONTROL DEVICE

TECHNICAL FIELD

The present invention relates to data transmission techniques to transmit contents, and particularly relates to a data transmission device and a data transmission control device in a content transmission system to transmit a plurality of contents.

BACKGROUND ART

Currently in order to broadcast by relay from a broadcast spot (broadcast scene) or the like, video/audio data that is shot/collected at the broadcast spot is radio-transmitted using SNG (Satellite News Gathering) using a communication satellite or using a FPU (Field Pickup Unit) enabling relay transmission via microwaves, thus transmitting video materials/audio materials for broadcasting to a broadcasting station. In general, in the relay using a communication satellite or a FPU, a mobile relay station called an outside broadcasting van is placed at a broadcast spot, and a line between the mobile relay station and an antenna on the broadcasting station side or at a base station is a dedicated line through which video materials/audio materials for broadcasting only are transmitted.

Conventionally, as shown in FIG. 15, for example, relay can be performed using a communication satellite or a FPU, and an outside broadcasting van 3200 equipped with switcher facility is placed at a broadcast spot, and thereby videos shot by a plurality of cameras 3100 are selectively transmitted from the outside broadcasting van 3200, thus transmitting the videos to a broadcasting station.

The following Patent Document 1, for example, discloses a technique for a more stable main link to transmit a data packet from a video output device (video source) to a display device (video display). According to this technique, a training session via an auxiliary channel is provided and prior to transmission of a data packet via the main link, a training signal is transmitted via the auxiliary channel.

The following Patent Document 2, for example, discloses a technique, in a system configured to transmit videos from a plurality of cameras to an image display device via a communication line, of making the image display device designate a camera from which video is to be received in accordance with selection schedule information.

PRIOR ART DOCUMENT

Patent Document

Patent Document 1: Japanese Patent Application Publication No. 2004-350266 (Abstract)
Patent Document 2: Japanese Patent Application Publication No. 08-228340 (paragraphs [0032] to [0041], FIG. 6)

In recent years, mobile-phone networks are widely spread, and such a general network (public circuit) may be used to implement a simple system to transmit video materials/audio materials for broadcasting. The simplest way is to use a general public circuit instead of a dedicated circuit for data transmission.

For instance, as shown in FIG. 16, in a possible configuration, radio transmission may be performed via a mobile phone network (public circuit) instead of a SNG or a FPU. In this case, however, radio transmission of the system shown in FIG. 15 is simply replaced with a mobile phone network (a base station 4300 and a network 4400), and a relay station 4200 has to be equipped with switcher facility and an operator manipulating this switcher also has to be placed at the broadcast spot. In this case, the configuration fails to implement the followings, i.e., to allow videos (a plurality of contents or all contents) shot by a plurality of cameras 4100 to be checked at a broadcasting station, to simplify the device configuration of the relay station to be placed at the broadcast spot, and to enable contents selected (designated) on the broadcasting station side (content reception side) to be immediately available for broadcasting.

As shown in FIG. 17, for example, in another possible configuration, radio transmission is performed by radio transmission devices 5200 each corresponding to one of a plurality of cameras 5100, and video shot by each of the plurality of cameras 5100 is transmitted via a mobile-phone network (a base station 5300 and a network 5400) to a base station. In this case, there is no need to place switcher facility as well as an operator manipulating this switcher at the broadcast spot. In this system configuration, however, since video corresponding to the number of cameras 5100 will be transmitted via the mobile phone network, the number of lines capable of handling the transmission band corresponding to the videos to be transmitted in number (corresponding to the number of cameras 5100) is required (in this drawing, one transmission line corresponds to one camera 5100, and the number of transmission lines necessary for one camera 5100 varies with the situation), so that a plurality of contents cannot be effectively transmitted under the situation securing minimum QoS (Quality of Service) (or under the situation where only limited minimum QoS can be secured).

Note here that, in the system shown in FIG. 17, for example, the plurality of cameras 5100 may be divided into some groups, and each group may share one radio transmission device 5200. However, in such a system configuration as well, since videos corresponding to the number of cameras 5100 are still transmitted via a mobile phone network, a plurality of contents cannot be effectively transmitted under the situation securing minimum QoS (or under the where only limited minimum QoS can be secured). Further, when videos corresponding to the number of the radio transmission devices 5200 are transmitted, all of the videos (all contents) shot by such a large number of cameras cannot be checked by the base station.

Further, in the technique disclosed in Patent Document 1, the auxiliary channel is for transmission of a signal to achieve stable transmission in the main link. Since the contents are to be transmitted via the main like, in order to transmit a plurality of contents, a stable link configuration (stable transmission speed) for the plurality of contents has to be ensured in the main link as well. That is, the technique disclosed in Patent Document 1 does not achieve effective transmission of a plurality of contents under the situation securing minimum QoS (or under the situation where only limited minimum QoS can be secured).

According to the technique disclosed in Patent Document 2, the image display device can designate a camera from which video is to be received in accordance with selection schedule information, thus enabling reception of a video from a necessary camera at a necessary timing. In this configuration, however, when video is requested from a plurality of cameras, for example, the plurality of cameras receiving the request will transmit the videos to the video display device. Therefore, this technique does not achieve effective transmission of a plurality of contents under the situation securing minimum QoS (or under the situation where only limited minimum QoS can be secured).

SUMMARY OF THE INVENTION

In view of the aforementioned problems, it is an object of the present invention to achieve all of the followings:

(1) when a plurality of contents are supplied from a content transmission side, these plurality of contents can be checked by a content reception side;

(2) under a situation securing minimum QoS (or under a situation where only limited minimum QoS can be secured), a plurality of contents can be effectively transmitted; and (3) the device configuration on the content transmission side is simplified, and contents selected on the content reception side can be used for broadcasting with a small time lag.

In order to fulfill the above object, a data transmission device of the present invention transmits a plurality of contents to a data reception device, and includes:

a setting information holding unit that holds setting information indicating each of the plurality of contents as a main content or a stand-by content, at least two or more contents among the plurality of contents being set as the main content and a remaining content other than the main contents among the plurality of contents being set as a stand-by content;

a content selection unit that categorizes each of the plurality of contents into the main content or the stand-by content on a basis of the setting information held at the setting information holding unit;

a main content transmission unit that transmits a content determined as the main content by the content selection unit via a high-quality line to the data reception device; and a stand-by content transmission unit that transmits a content determined as the stand-by content by the contents selection unit via a line of a quality lower than the high-quality line to the data reception device.

With this configuration, the object of the present invention can be achieved, so that under a situation securing minimum QoS, a plurality of contents can be effectively transmitted.

In order to fulfill the above object, a data transmission control device of the present invention controls data transmission by a data transmission device, and the data transmission device for transmitting a plurality of contents to a data reception device, and the data transmission device including: a setting information holding unit that holds predetermined setting information; a content selection unit that categorizes each of the plurality of contents into a main content or a stand-by content on a basis of the predetermined setting information held at the setting information holding unit; a main content transmission unit that transmits a content determined as the main content by the content selection unit via a high-quality line to the data reception device; and a stand-by content transmission unit that transmits a content determined as the stand-by content by the content selection unit via a line of a quality lower than the high-quality line to the data reception device. The data transmission control device includes a reporting unit that reports, to the data transmission device, the predetermined setting information indicating each of the plurality of contents as the main content or the stand-by content, at least two or more contents among the plurality of contents being set as the main contents and a remaining content other than the main contents among the plurality of contents being set as the stand-by content.

With this configuration, the object of the present invention can be achieved, so that under a situation securing minimum QoS, a plurality of contents can be effectively transmitted.

The present invention is configured as stated above, and thereby has advantageous effects of achieving all of the followings:

(1) when a plurality of contents are supplied from a content transmission side, these plurality of contents can be checked by a content reception side;

(2) under a situation securing minimum QoS (or under a situation where only limited minimum QoS can be secured), a plurality of contents can be effectively transmitted; and (3) the device configuration on the content transmission side is simplified, and contents selected on the content reception side can be used for broadcasting with a small time lag.

BRIEF DESCRIPTION OF THE DRAWINGS

FIG. 2 is a sequence chart showing an exemplary operation in one embodiment of the present invention.

FIG. 3A schematically shows a first exemplary video transmission state in one embodiment of the present invention.

FIG. 3B schematically shows a second exemplary video transmission state in one embodiment of the present invention.

FIG. 3D schematically shows a fourth exemplary video transmission state in one embodiment of the present invention.

FIG. 4 is a block diagram showing an exemplary data transmission device in one embodiment of the present invention.

FIG. 5 is a block diagram showing an exemplary configuration of a content selection unit that a data transmission device in one embodiment of the present invention has.

DESCRIPTION OF EMBODIMENTS

The following describes embodiments of the present invention, with reference to the drawings. In the following descriptions of embodiments, the device configuration is represented with functional blocks, which may be implemented by hardware or a CPU in a computer. Processing executed by each device is represented with steps, which may be implemented by processing by hardware or a CPU executing a predetermined program. Further, as long as the processing according to the present invention is implemented, the execution order of the processing represented with steps in a flowchart can be changed appropriately.

Figure 1:
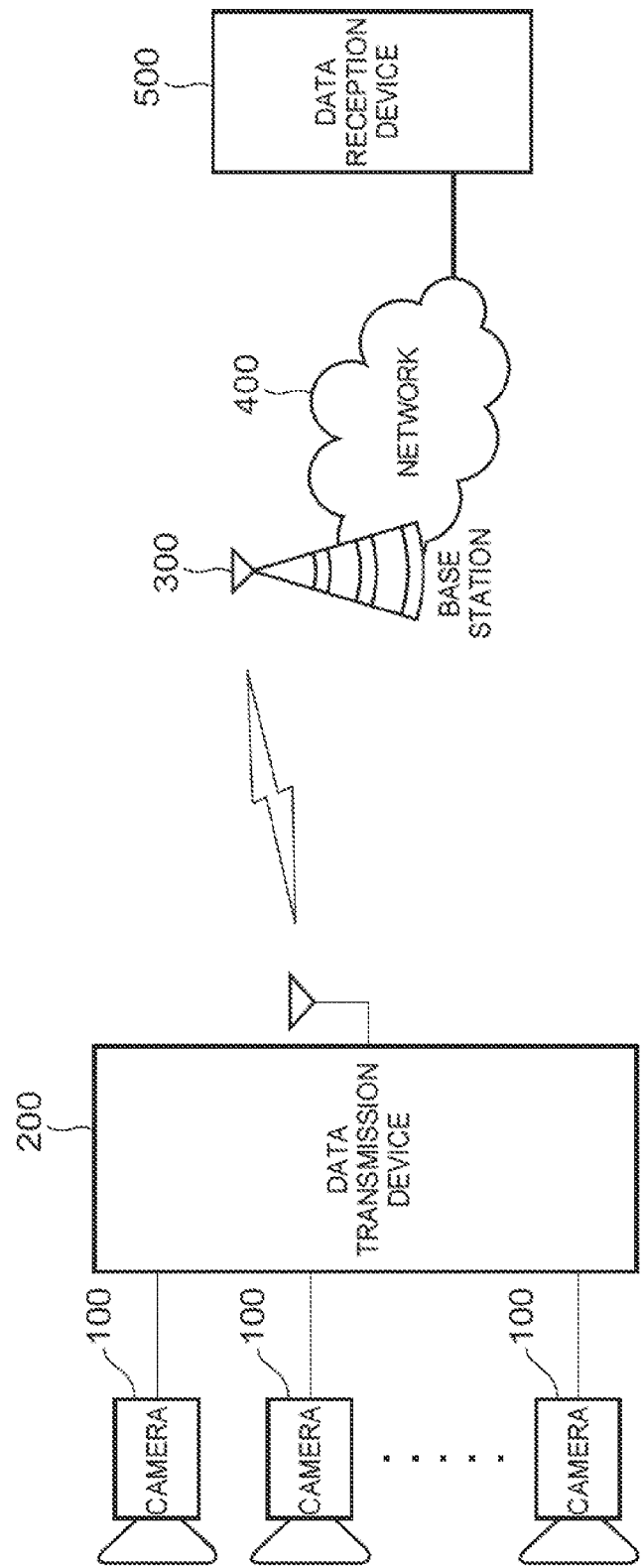
FIG. 1 shows an exemplary system configuration in one embodiment of the present invention.

To begin with, referring to FIG. 1, a system configuration in one embodiment of the present invention is described below. FIG. 1 shows an exemplary system configuration in one embodiment of the present invention. FIG. 1 shows a plurality of cameras (imaging devices) 100, a data transmission device 200, a base station 300, a network 400 and a data reception device 500.

The cameras 100 shown in FIG. 1 have a function of shooting videos to be broadcasting materials. Videos shot at a broadcast spot by the plurality of cameras 100 are supplied to the data transmission device 200 via a wired or wireless medium. The present specification illustrates, as one example, the situation where videos are shot by the cameras 100, and such videos are transmitted to a broadcasting station as broadcasting materials. In a more general case, however, the cameras 100 may be a content acquisition device capable of acquiring contents made up of broadcasting materials such as video and/or audio. That is, the cameras 100 in the present specification can be read as a content acquisition device, and videos shot by the cameras 100 can be read as contents acquired by the content acquisition device.

The data transmission device 200 shown in FIG. 1 is placed at a broadcast spot, and has a function of transmitting videos supplied from the plurality of cameras 100 to the data reception device 500 via a wireless medium between the data transmission device 200 and the base station 300 and the network 400. The data transmission device 200 further has a function of receiving state notification information from the data reception device 500 and when transmitting video to the data reception device 500, selectively processing videos supplied from the plurality of cameras 100 on the basis of the received state notification information. The data transmission device 200 still further has a function of managing and controlling a transmission band when transmitting videos to the data reception device 500.

The base station 300 and the network 400 shown in FIG. 1 make up a communication line to implement a communication between the data transmission device 200 and the data reception device 500. The base station 300 and the network 400 may be infrastructure for data communication services that an existing communication carrier has or may be a public circuit network that other various users can use, for example.

The data reception device 500 shown in FIG. 1 is placed at a broadcasting station, and has a function of receiving videos transmitted from the data transmission device 200 via the wireless medium between the data transmission device 200 and the base station 300 and the network 400 and reproducing the same. The data reception device 500 further has a function of informing the data transmission device 200 of settings on the handling of videos shot by each of the plurality of cameras 100 as the state notification information.

Herein, the following describes a video transmission state according to the present invention. Videos (contents) shot by each of the plurality of cameras 100 are transmitted from the data transmission device 200 to the data reception device 500, and in the present invention, contents to be transmitted from the data transmission device 200 to the data reception device 500 can be divided into three types including a broadcasting content, a switching content and a stand-by content. In the following description, assume that N-pieces of cameras 100 are present and N-pieces of contents are transmitted from the data transmission device 200 to the data reception device 500.

The broadcasting content is transmitted from the data transmission device 200 to the data reception device 500 via a high-quality (securing QoS, transmitted preferentially, being a wide band and the like) line while keeping the content quality that can be used for actual broadcasting (e.g., high-definition video). Basically, only one broadcasting content is set, and one line to transmit a broadcasting content in the conventional technique is necessary to transmit this broadcasting content (when the transmission band necessary for one broadcasting content varies with a situation, the corresponding number of lines will be necessary). The broadcasting content is a main content to be used for actual broadcasting.

Similarly to the broadcasting content, the switching content also is transmitted from the data transmission device 200 to the data reception device 500 via a high-quality (securing QoS, transmitted preferentially, being a wide band and the like) line while keeping the content quality that can be used for actual broadcasting (e.g., high-definition video). m pieces of switching contents may be set (m<N−1), and m lines, each for transmission of a broadcasting content in the conventional technique, are necessary to transmit these switching contents. Although the switching content is not a main content used for actual broadcasting, the switching content keeps the same quality as that of the broadcasting content, and therefore the switching content is in a middle state between the broadcasting content and the stand-by content. It is desirable that a content to be used as the next scene be set as the switching content.

On the other hand, the stand-by content may be of a content quality that can be checked by the data reception device 500 as to what a content it is (i.e., it does not have to be high-definition video that can be used as a broadcasting material), and may be a content that does not have to be transmitted to the data reception device 500 via a high-quality line that can be used for broadcasting. In this way, the stand-by content may be transmitted via a low-quality line (e.g., a line for proxy data transmission, QoS of a middle degree or lower or a line having secured priority, which does not have to be always set to achieve a low quality, the line having advantages points such that it can be implemented with a normal line, at a low cost and with less traffic, meaning that the line has a low transmission quality than a high-quality line). The remaining contents that are not set as the broadcasting content and the switching contents are set as the stand-by contents, which means that there are (N−m−1) pieces of stand-by contents.

As stated above, both of the broadcasting content and the switching contents have to be transmitted via similar high-quality lines, and so in the present specification, the broadcasting content and the switching contents are collectively called main contents. As described later, the data transmission device 200 does not have to make a selection between the broadcasting content and the switching contents, but makes a selection between the main contents and the stand-by contents for transmission via a high-quality line.

Further, in the present specification, a high-quality line for transmitting the broadcasting content and the switching contents is called a main content line, and a low-quality line for transmitting the stand-by contents is called a proxy data transmission line. Herein, correspondence between these lines and actual physical transmission lines may vary depending on a band that can be secured by each physical transmission line, and the main content line and the proxy data transmission line may be logical lines. For instance, these logical lines may be called a session, a connection, a bearer, a flow or the like depending on various communication schemes.

Figure 13:
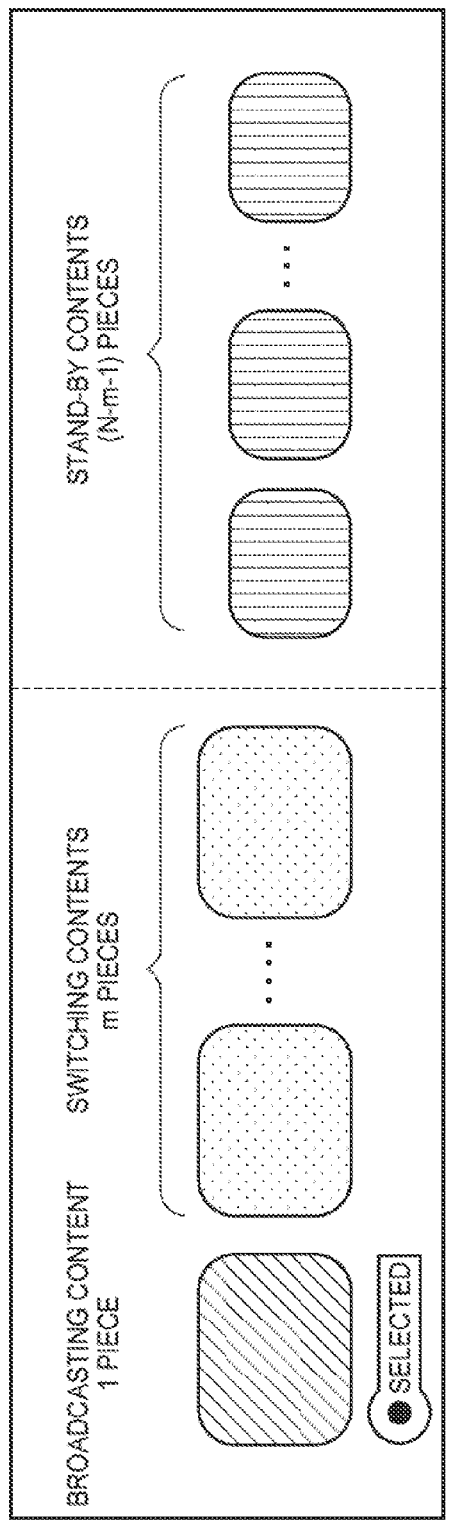
FIG. 13 schematically shows a fifth exemplary video transmission state (when a plurality of switching contents are set) in one embodiment of the present invention.

In the present invention, (1+m) main content lines may be prepared, which are required to transmit main contents, and the remaining contents (stand-by contents corresponding to the (N−m−1) lines) may be transmitted via the proxy data transmission lines (see FIG. 13, for example). More specifically, for example, let that the number of contents is 5 (e.g., five cameras exist) and the number of the switching contents is set at 1 (i.e., the number of main contents is set at 2), the number of the main content lines required to transmit the main contents is 2, and the remaining contents (stand-by contents corresponding to three lines) may be transmitted via proxy data transmission lines (see FIGS. 3A to 3D, for example).

Since a line of a quality lower than that for the main content lines can be used for the proxy data transmission lines and further the content quality may be in a degree that can be checked by the data reception device 500, screen splitting display may be used so that the (N−m−1) pieces of stand-by contents are encoded into data for one screen and are collected as one stand-by content. Alternatively, videos of the stand-by contents may be captured at regular time intervals, and may be transmitted as a static image. In this way, any processing method and transmission method can be used for the stand-by contents as long as they can be checked on the reception side.

As described above, in the present invention, the main contents (broadcasting content and switching contents) and the stand-by contents are configured, which are transmitted from the data transmission device 200 to the data reception device 500. Herein, the data reception device 500 transmits state notification information instructing a setting change to the data transmission device 200, thus enabling a change of a setting in the data transmission device 200. In the present invention, there are two ways of changing contents setting.

In a first way (selection of a switching content) for the changing method, a switching content and a stand-by content are interchanged. According to this changing method, when a content from a camera 100 to be used for the next scene is selected from the stand-by contents in the data reception device 500, the selected stand-by content is set as a switching content, and one of the contents that were a switching content until now is set as a stand-by content. That is, according to this method, the selected stand-by content is upgraded to a switching content, and instead one of the switching contents is downgraded to a stand-by content. Hereinafter, the state notification information including an instruction to interchange a switching content and a stand-by content is called main content selection information.

In a second way (selection of a broadcasting content) for the changing method, a broadcasting content and a switching content are interchanged. According to this changing method, a broadcasting content and a switching content are interchanged in status. For instance, a flag (a flag indicating that the content is a broadcasting flag, called a selection state flag in the present specification) assigned to a content that was a broadcasting content until now is reassigned to one of switching contents. According to this method, one of the switching contents is upgraded to a broadcasting content, and instead the broadcasting content until now is downgraded to a switching content. Herein, since the data transmission device 200 transmits both of the broadcasting content and the switching contents to the data reception device 500 by a similar transmission method (transmission via the main content lines) as stated above, the content transmission state does not change substantially in spite of logical interchanging of the status between the broadcasting content and the switching content.

Referring now to FIG. 2 and FIGS. 3A to 3D, the following briefly describes an operation of the present invention in the system configuration shown in FIG. 1. FIG. 2 is a sequence chart showing an exemplary operation in one embodiment of the present invention. FIGS. 3A to 3D schematically show exemplary video transmission states in one embodiment of the present invention.

In FIG. 2, firstly initial setting of data transmission is performed between the data transmission device 200 and the data reception device 500, whereby data transmission to be performed subsequently from the data transmission device 200 to the data reception device 500 becomes ready (Step S1000). In this initial setting, state notification information for setting of an initial state is informed from the data reception device 500 to the data transmission device 200.

Assume that, in the initial setting at Step S1000, video transmission in the state A shown in FIG. 3A becomes ready. That is, assume that the data transmission device 200 transmits videos shot by five cameras (the aforementioned N=5), only one switching content (the aforementioned m=1) is set, and as an initial state, content A is selected as the broadcasting content, content B is selected as the switching content and the remaining three contents C to E are selected as stand-by contents. In this case, in the initial setting at Step S1000, the data transmission device 200 and the data reception device 500 mutually hold that a transmission state of the contents is in state A shown in FIG. 3A, and the data transmission device 200 transmits contents A and B as main contents (content A as the broadcasting content, content B as the switching content) and the remaining contents C to E as stand-by contents to the data reception device 500 (Step S1010).

Assume herein that in the video transmission state at Step S1010, the data reception device 500 interchanges the switching content (content B) and the stand-by content (content D) (Step S1020). Interchanging between the switching content and the stand-by content may be performed, for example, simply by selecting a stand-by content to be upgraded to the switching content, immediately followed by interchanging between the selected stand-by content and a switching content. That is, when an operator of the data reception device 500 performs an operation to select a stand-by content (content D), then content D is set as the switching content and at the same time content B that was a switching content until now is set as the standing-by content in the data reception device 500.

Alternatively, at the time of selection of a stand-by content, a switching content to be interchanged with the stand-by content may be designated. This is effective for the case where there is a plurality of switching contents, for example. Alternatively, when there is no special designation about a switching content to be interchanged, a switching content as an interchanging target may be automatically set on the basis of a predetermined condition such as the history of contents setting in the past (history of contents interchange), priority or the like. For instance, interchanging may be performed so that a content selected as the broadcasting content one time ago before the interchanging remains as the switching content. Alternatively, priority of interchange may be set for each content, and a switching content as an interchange target may be decided on the basis of this priority. The data reception device 500 may decide a switching content as an interchange target, or a notification may be given to the data transmission device 200 without designating an interchange target and the data transmission device 200 may decide a switching content as an interchange target.

The data reception device 500 informs the data transmission device 200 of state notification information (main content selection information) indicating that a selection is made so as to interchange the switching content (content B) and the stand-by content (content D) (Step S1030). On the basis of the informed state notification information, the data transmission device 200 updates setting information held in the data transmission device 200. As a result, the video transmission state in the data transmission device 200 as well is changed in accordance with the change of the setting information (Step S1040). Thereby, the data transmission device 200 and the data reception device 500 mutually hold that the video transmission state is in state B as shown in FIG. 3B, so that the data transmission device 200 transmits contents A and D as main contents (content A as the broadcasting content, content D as the switching content) and the remaining contents B, C and E as stand-by contents to the data reception device 500 (Step S1050).

Assume that, in this state, the data reception device 500 interchanges the broadcasting content (content A) and the switching content (content B) (Step S1060), for example. Interchanging between the broadcasting content and the switching content may be performed, for example, by selecting a switching content to be set as the broadcasting content, immediately followed by interchanging between the selected switching content and the broadcasting content selection state of the current broadcasting content. That is, in this case, an operator of the data reception device 500 performs an operation to select a switching content (content D), for example, whereby content D is set as the broadcasting content and at the same time content A that was the broadcasting content until now is set as the switching content in the data reception device 500. Similarly to the case of selecting the stand-by content, it may be explicitly designated which content among the switching contents is to be set as the broadcasting content, or even when there is a plurality of switching contents, a content that is to be upgraded to the broadcasting content may be automatically set among the plurality of switching contents.

Figure 3C:
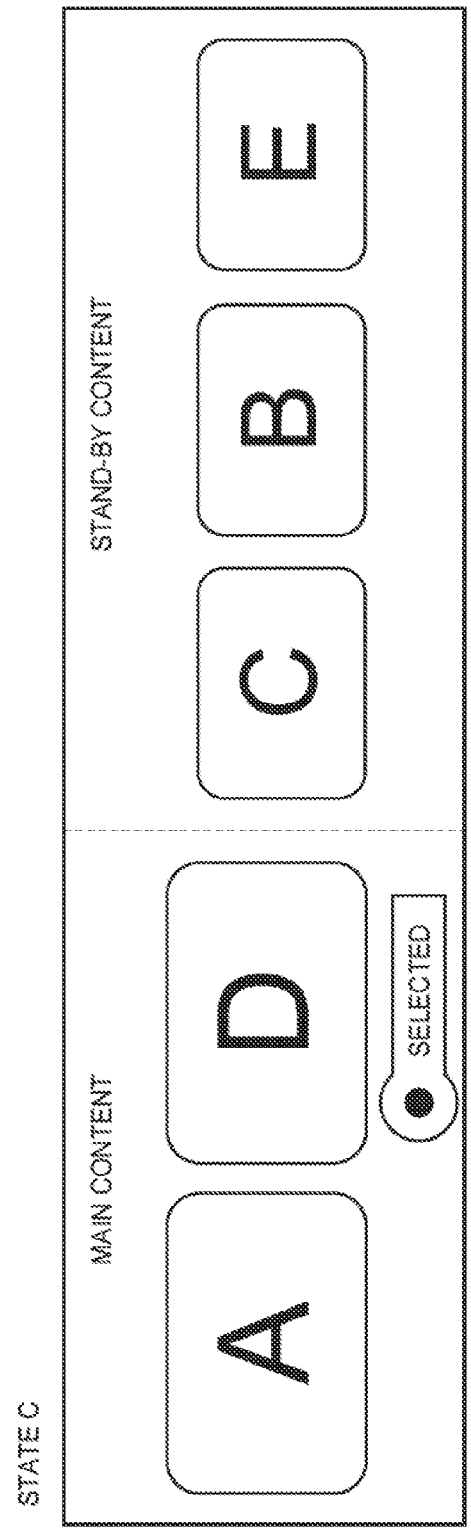
FIG. 3C schematically shows a third exemplary video transmission state in one embodiment of the present invention.

Then, the data reception device 500 informs the data transmission device 200 of state notification information (selection state notification information) indicating that a selection is made so as to interchange the broadcasting content (content A) and the switching content (content D) (Step S1070). On the basis of the informed state notification information, the data transmission device 200 updates setting information (Step S1080). Thereby, the data transmission device 200 and the data reception device 500 mutually hold that the contents transmission state is in state C as shown in FIG. 3C. Note here that in updating of the setting information at Step S1080, the setting information is changed only in that the content selected as the broadcasting content is switched from content A to content D. Therefore, the video transmission state where contents A and D (content A as the broadcasting content, content D as the switching content) as main contents and the remaining contents B, C and E as stand-by contents are transmitted is not changed (Step S1090). That is, the video transmission state at Step S1050 and the video transmission state at Step 1080 are substantially the same.

Further, in this state, assume that, for example, the data reception device 500 interchanges the switching content (content A) and the stand-by content (content E) (Step S1010). The data reception device 500 informs the data transmission device 200 of state notification information (main content selection information) indicating that a selection is made so as to interchange the switching content (content A) and the stand-by content (content E) (Step S1110). On the basis of the informed state notification information, the data transmission device 200 updates the setting information held in the data transmission device 200. As a result, the video transmission state in the data transmission device 200 as well is changed in accordance with the change of the setting information (Step S1120). Thereby, the data transmission device 200 and the data reception device 500 mutually hold that the video transmission state is in state D as shown in FIG. 3D, so that the data transmission device 200 transmits contents D and E as main contents (content D as the broadcasting content, content E as the switching content) and the remaining contents A, B and C as stand-by contents to the data reception device 500 (Step S1130).

As stated above, the selection at Step S1060 is made simply to interchange the broadcasting content and the switching content, and even when the state notification information (selection state notification information) is informed to the data transmission device 200 at Step S1070, the video transmission state in the data transmission device 200 does not change substantially. Therefore, the data reception device 500 does not have to always inform the data transmission device 200 of the state notification information at Step S1070. Further, the data transmission device 200 may manage the main contents/stand-by contents only, and does not have to always manage as to which one of the main contents is the broadcasting content or the switching contents. However, for more stable and secure switching of video transmission, it is desirable that the broadcasting content and the switching contents are clearly distinguished for the data transmission device 200 and the data reception device 500, such as by a notification of the state notification information at Step S1050, for example.

Referring next to FIG. 4, an exemplary configuration of the data transmission device 200 shown in FIG. 1 is described below. FIG. 4 is a block diagram showing an exemplary data transmission device in one embodiment of the present invention. The data transmission device 200 shown in FIG. 4 includes a plurality of content I/Fs (content interfaces) 201, a content selection unit 202, a main content data generation unit 203, a main content data line setting/control unit 204, a stand-by content data generation unit 205, a stand-by content data line setting/control unit 206, a data transmission I/F (data transmission interface) 207 and a state notification information/state confirmation notification information input/output I/F (state notification information/state confirmation notification information input/output interface) 208.

The content I/Fs 201 are interfaces to fetch videos supplied from the cameras 100 into the data transmission device 200. In FIG. 4, each of the plurality of content I/Fs 201 corresponds to one of the plurality of cameras 100, and contents supplied from the cameras 100 are supplied to the content selection unit 202 via the content I/Fs 201.

The content selection unit 202 has a function of dividing a plurality of videos supplied from the content I/Fs 201 into main contents and stand-by contents for outputting. The content selection unit 202 stores setting information that is created based on the state notification information acquired from the data reception device 500 via the state notification information/state confirmation notification information input/output I/F 208, for example, and on the basis of this setting information, the content selection unit 202 discriminates whether a content supplied from a certain camera 100 is a main content or a stand-by content. Then, the content selection unit 202 outputs the content determined as a main content to the main content data generation unit 203, and outputs the content determined as the stand-by content to the stand-by content data generation unit 205. The content selection unit 202 further can transmit the stored setting information to the data reception device 500 via the state notification information/state confirmation notification information input/output I/F 208. The detailed configuration of the content selection unit 202 will be described later, with reference to FIG. 5.

The main content data generation unit 203 has a function of processing the main content supplied from the content selection unit 202 into main content data for transmission. For instance, the main content data generation unit 203 has a function of performing encoding of the main content. Herein, as stated above, the main contents include the broadcasting content and the switching contents, where the number of switching contents can be any number. Assume herein that one switching content is set, and FIG. 4 shows two main content data generation units 203 to represent the existence of a main content data generation unit 203 to generate main content data based on the broadcasting content and a main content data generation unit 203 to generate main content data based on the switching content. The main content data generated at the main content data generation units 203 are supplied to the data transmission I/F 207 to be transmitted to the data reception device 500. Herein, the main contents (both of the broadcasting content and the switching content) are transmitted to the data reception device 500 via the main content lines in a state of holding a content quality that can be used for broadcasting materials (high-definition video) and being available for broadcasting.

The main content data line setting/control unit 204 has a function of managing and controlling setting to transmit the main content data. As stated above, the main content data has to be transmitted stably via the main content lines, and the main content data line setting/control unit 204 supplies information on QoS control or the like for transmission via the main content lines to the data transmission I/F 207. Herein, the main content data line setting/control unit 204 has to manage so that all of the main contents are transmitted through the main content lines.

The stand-by content data generation unit 205 has a function of processing the stand-by contents supplied from the content selection unit 202 into stand-by content data for transmission. For instance, the stand-by content data generation unit 205 has a function of performing encoding of the stand-by contents. The stand-by content data generated at the stand-by content data generation unit 205 are supplied to the data transmission I/F 207 to be transmitted to the data reception device 500. Herein, the stand-by contents may be of a content quality that can be checked by the data reception device 500 as to what a content it is (i.e., it does not have to be high-definition video that can be used as a broadcasting material), and does not have to be transmitted to the data reception device 500 via a high-quality line that can be used for broadcasting. The stand-by content data generation unit 205 may compress the stand-by contents, for example, and may process the stand-by contents so that a plurality of stand-by contents are collectively displayed in one screen. Although various forms can be considered as stated above, FIG. 4 describes the stand-by content data generation unit 205 as one block.

The stand-by content data line setting/control unit 206 has a function of managing and controlling setting to transmit the stand-by content data. As stated above, the stand-by content data does not have to be always transmitted via the main content lines, and the stand-by content data line setting/control unit 206 supplies information on QoS control or the like of the stand-by content data for such transmission to the data transmission I/F 207.

The data transmission I/F 207 is an interface to transmit the main content data supplied from the main content data generation unit 203 and the stand-by content data supplied from the stand-by content data generation unit 205 to the data reception device 500 via a physical I/F 210. The data transmission I/F 207 transmits the main content data based on setting information supplied from the main content data line setting/control unit 204 and transmits the stand-by content data based on setting information supplied from the stand-by content data line setting/control unit 206.

The state notification information/state confirmation notification information input/output I/F 208 has functions of supplying state notification information received from the data reception device 500 via the physical I/F 210 to the content selection unit 202 and transmitting, as state confirmation notification information, setting information held at the content selection unit 202 to the data reception device 500 via the physical I/F 210.

The physical I/F 210 has a function of transmitting main content data and stand-by content data supplied from the data transmission I/F 207 to the data reception device 500, a function of supplying state notification information received from the data reception device 500 to the state notification information/state confirmation notification information input/output I/F 208 and a function of state confirmation notification information supplied from the state notification information/state confirmation notification information input/output I/F 208 to the data reception device 500. The physical I/F 210 may have a function of combination, distribution, control and the like of a band for a group of a plurality of physical lines, for example.

Referring next to FIG. 5, the following describes the configuration of the content selection unit 202 shown in FIG. 4. FIG. 5 is a block diagram showing an exemplary configuration of the content selection unit that the data transmission device in one embodiment of the present invention has. The content selection unit 202 shown in FIG. 5 includes a plural contents management information holding unit 2021 containing main content setting information 2022 and stand-by content setting information 2023, an information extraction unit 2024 and an information output unit 2025.

The plural contents management information holding unit 2021 has a function of holding setting information that is to be referred to for determination as to whether a content supplied from the content I/F 201 is a main content or a stand-by content. The setting information held by the plural contents management information holding unit 2021 is roughly divided into two including the main content setting information 2022 and the stand-by content setting information 2023.

The main content setting information 2022 includes information to specify main contents (broadcasting content and switching contents). For instance, the main content setting information 2022 includes a content ID indicating a main content described therein, and further includes a flag (selection state flag) that is set for a content as a broadcasting content. The stand-by content setting information 2023 includes information (e.g., a content ID) to specify stand-by contents. That is, the content selection unit 202 can refer to the setting information (the main content setting information 2022 and the stand-by content setting information 2023) to specify whether a certain content is a main content or a stand-by content, and further in the case of a main content, to specify whether it is a broadcasting content or a switching content. Herein, the content ID is information to specify a content in a transmission section and between transmission/reception devices. As the content ID, for example, information on a camera connected to the data transmission device, information on a camera connection interface of the data transmission device and information contained in contents (this may be called meta-data distinguished from the content itself) as well as a designation set by a user for the information and a value assigned so as to enable unique distinction of them in the device/between the devices can be used.

The information extraction unit 2024 has a function of extracting a notification on a content setting change from state notification information received from the data reception device 500 via the state notification information/state confirmation notification information input/output I/F 208. The information extraction unit 2024 further has a function of, on the basis of the extracted notification on a content setting change, updating setting information (the main content setting information 2022 and the stand-by content setting information 2023) held at the plural contents management information holding unit 2021.

The information output unit 2025 has a function of outputting contents (state confirmation notification information) of the setting information (the main content setting information 2022 and the stand-by content setting information 2023) held at the plural contents management information holding unit 2021 to inform the data reception device 500 of the same. The notification of the state confirmation notification information to the data reception device 500 enables the data reception device 500 to securely understand the setting information currently held at the data transmission device 200.

Figure 6:
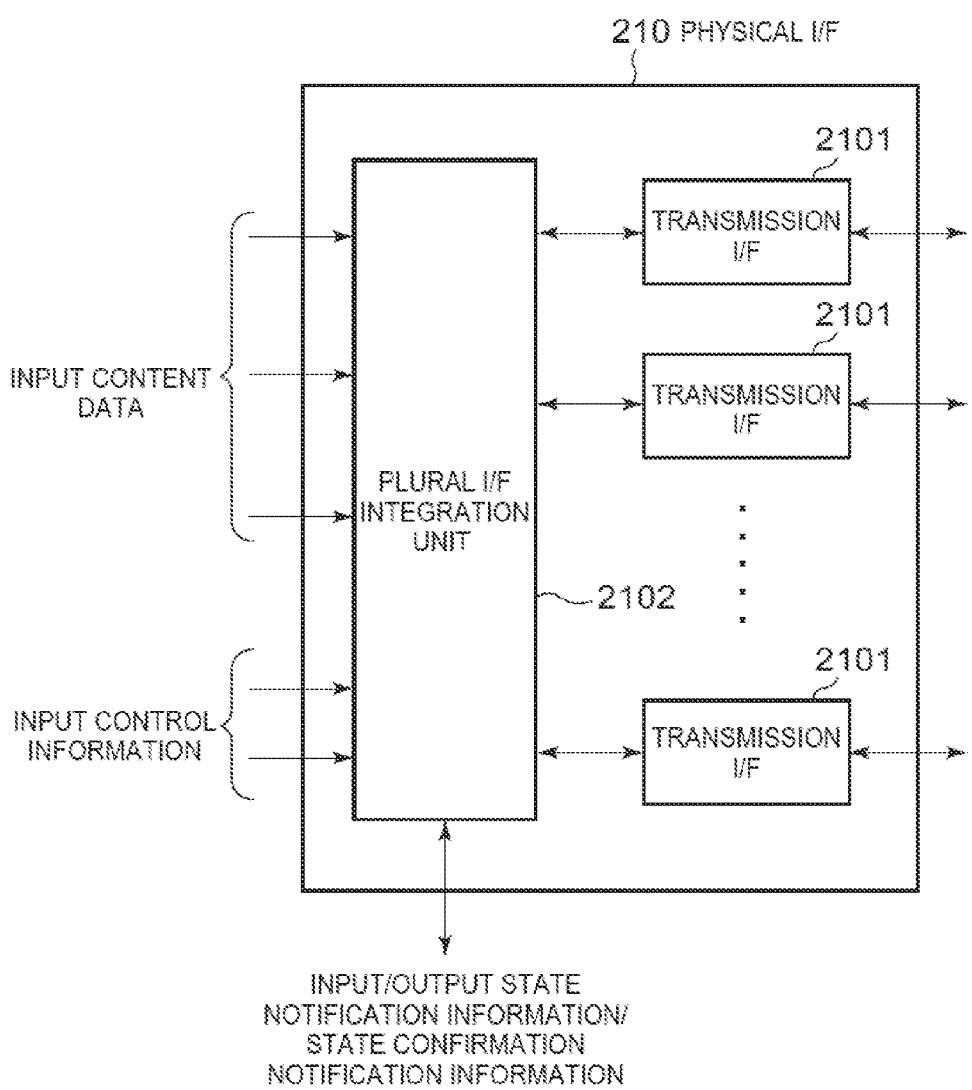
FIG. 6 is a block diagram showing an exemplary configuration of a physical interface that a data transmission device in one embodiment of the present invention has.

Referring next, to FIG. 6, the following describes the configuration of the physical I/F 210 shown in FIG. 4. FIG. 6 is a block diagram showing an exemplary configuration of the physical I/F that the data transmission device in one embodiment of the present invention has. The physical I/F 210 shown in FIG. 6 includes a plurality of transmission I/Fs (transmission interfaces) 2101, and includes a plural I/F integration unit 2102 to integrate these transmission I/Fs (transmission interfaces) 2101. Such a configuration including the plurality of transmission I/Fs 2101 facilitates dynamic setting change of the transmission I/Fs 2101, and for instance, a total band that can be secured by the plurality of transmission I/Fs 2101 may be allocated seamlessly to a line for each content, each line of one content may be distributed over a plurality of transmission I/Fs 2101, or a specific line may be allocated to a specific transmission I/F 2101, thereby facilitating absorption of fluctuations in a band or delay, management of the total band and change of the number of main contents and the like.

Herein, the change of the number of main contents may include processing of changing the number of lines required (or line quality/ratio of numbers for each band) and mapping with the physical I/F 210 in association with a dynamic switching into the case of one main content (not including a switching content) or a change of the number of switching contents provided, which are described later.

Figure 7:
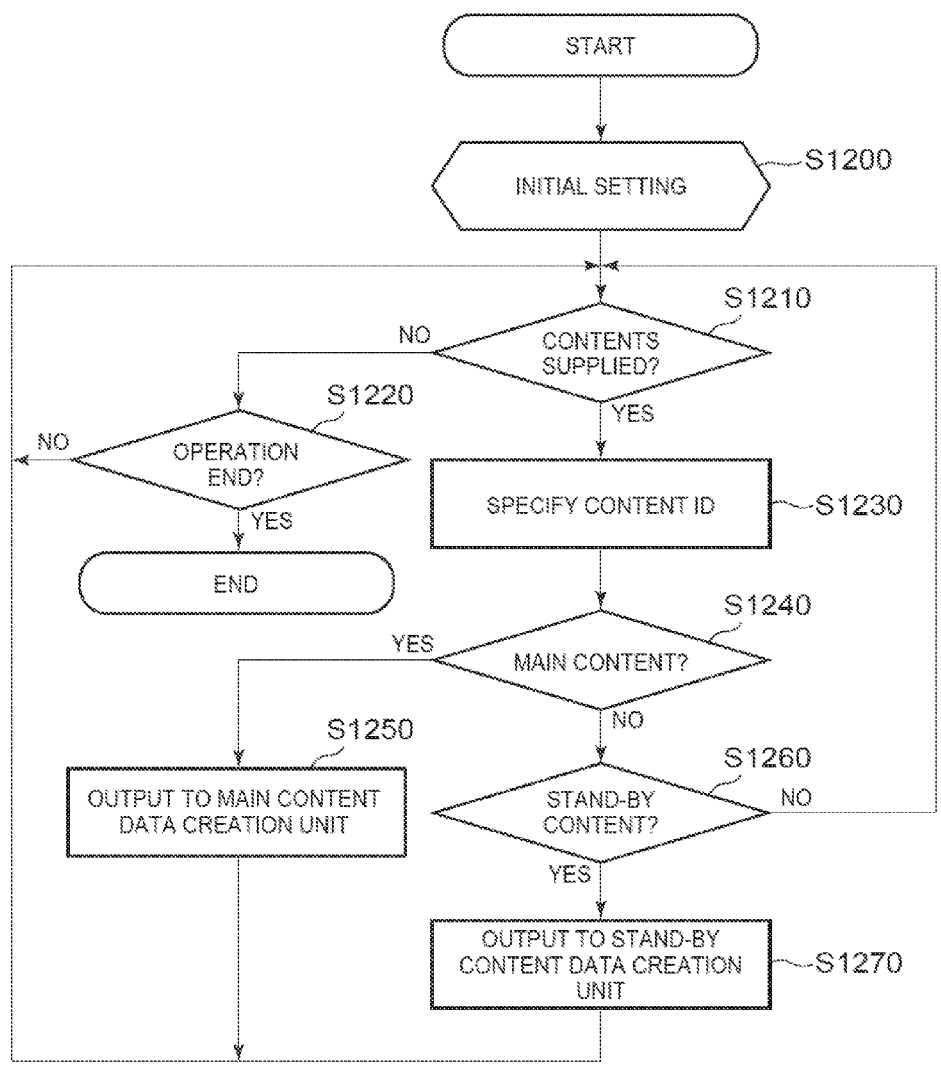
FIG. 7 is a flowchart showing exemplary content selection processing by a content selection unit that a data transmission device in one embodiment of the present invention has.

Referring next to FIG. 7, the following describes content selection processing at the content selection unit 202 shown in FIG. 5. FIG. 7 is a flowchart showing exemplary content selection processing by the content selection unit that the data transmission device in one embodiment of the present invention has.

In FIG. 7, firstly, the content selection unit 202 performs initial setting (Step S1200). This processing is advance preparation such as activation of the data transmission device 200, notification of the state notification information from the data reception device 500 to set an initial state, setting of setting information (the main content setting information 2022 and the stand-by content setting information 2023) on the basis of this state notification information and the like.

The content selection unit 202 stands by until a content is supplied from the content I/F 201 or this operation of content selection processing ends (Steps S1210, S1220), and when a content is supplied, the content selection unit 202 specifies a content ID of the content (Step S1230). Then, the content selection unit 202 refers to setting information (the main content setting information 2022 and the stand-by content setting information 2023) to categorize the content, and determines whether the supplied content is a main content or a stand-by content. More specifically, the content selection unit 202 firstly determines whether the content ID specified at Step S1230 is registered in the main content setting information 2022 or not (Step S1240). When the content ID is registered in the main content setting information 2022, the content selection unit 202 determines that the content is a main content, and outputs the same to the main content data generation unit 203 (Step S1250). When the content ID is not registered in the main content setting information 2022, the content selection unit 202 determines whether the content ID specified at Step S1230 is registered in the stand-by content setting information 2023 or not (Step S1260). When the content ID is registered in the stand-by content setting information 2023, the content selection unit 202 determines that this content is a stand-by content, and outputs the same to the stand-by content data generation unit 205 (Step S1270).

As stated above, the content selection unit 202 determines that a supplied content is any one of the main content and the stand-by content, and selectively outputs the main content to the main content data generation unit 203 and the stand-by content to the stand-by content data generation unit 205. Note here that the present invention is based on the assumption that the content IDs of all contents supplied to the content selection unit 202 are registered in any of the main content setting information 2022 and the stand-by content setting information 2023. Instead, when the content ID of the supplied content is not registered in any of the main content setting information 2022 and the stand-by content setting information 2023, any addition processing may be performed. For instance, a content that is not registered in any of the main content setting information 2022 and the stand-by content setting information 2023 may be dealt with as a main content or as a stand-by content, or any processing may be performed thereto and it may be not output. Further information (warning about unregistered content ID) reporting that the content ID is not registered in any of the main content setting information 2022 and the stand-by content setting information 2023 may be informed to the data reception device 500, or a content ID may be automatically assigned (and it may be registered in the stand-by content setting information 2023, for example) and a notification as such may be issued.

Figure 8:
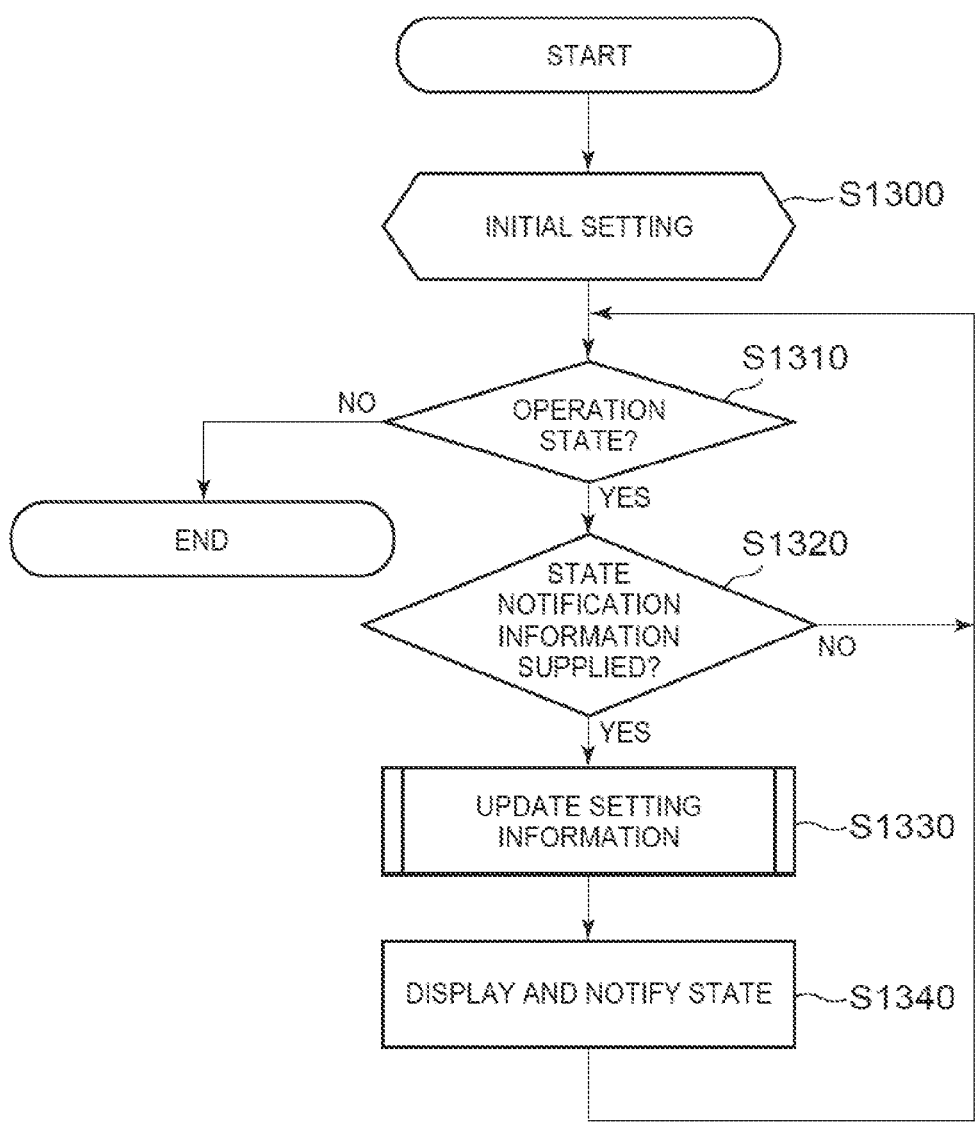
FIG. 8 is a flowchart showing exemplary setting update processing by a content selection unit that a data transmission device in one embodiment of the present invention has.

Referring next to FIG. 8, the following describes setting processing of a selection state at the content selection unit 202 shown in FIG. 5. FIG. 8 is a flowchart showing exemplary setting update processing by the content selection unit that the data transmission device in one embodiment of the present invention has. Note here that the setting update processing shown in FIG. 8 is performed in parallel with the aforementioned content selection processing shown in FIG. 7.

In FIG. 8, firstly the content selection unit 202 performs initial setting (Step S1300). This processing is advance preparation such as activation of the data transmission device 200, notification of the state notification information from the data reception device 500 to set an initial state, setting of setting information (the main content setting information 2022 and the stand-by content setting information 2023) on the basis of this state notification information and the like.

Next, the content selection unit 202 determines whether it is an operation state or not where content selection processing is performed to the content supplied from the content I/F 201 (Step S1310). Herein, this content selection processing is to perform the processing shown in FIG. 7, for example, to categorize the content supplied from the content I/F 201 into a main content and a stand-by content.

When it is not an operation state of the content selection processing, the content selection unit 202 does not perform processing of categorizing the content into a main content or a stand-by content for outputting, and so the setting update processing ends.

On the other hand, when it is an operation state of the content selection processing (i.e., in parallel with this setting update processing, contents are categorized and output), a determination is made whether state notification information is supplied or not (Step S1320). When the state notification information is not supplied, the setting update processing returns to Step S1310 to end the operation state or to enter a stand-by state until the state notification information is supplied. In this case, the main content setting information 2022 and the stand-by content setting information 2023 are not especially changed, and in the content selection processing operated in parallel, contents are categorized on the basis of the already set and held setting information.

On the other hand, when the state notification information is supplied, the content selection unit 202 performs update processing of the setting information (Step S1330). This update processing of the setting information is to update the setting information (the main content setting information 2022 and the stand-by content setting information 2023) held at the plural contents management information holding unit 2021 on the basis of the supplied state notification information. The detailed descriptions on the update processing of the setting information at Step S1330 are provided later, with reference to FIG. 9.

When the update processing of the setting information at Step 31330 is completed, the setting information held at the plural contents management information holding unit 2021 is updated, and the content selection unit 202 can display to the data reception device 500 that the setting information is updated and its updated contents (e.g., including an ID of the camera 100 shooting the updated contents) and can inform the data reception device 500 of the updated contents (e.g., including an ID of the camera 100 shooting the updated contents) (Step S1340). Then, the setting update processing returns to Step S1310 to end the operation state or to enter a stand-by state until the state notification information is supplied. In this case, in the content selection processing operated in parallel, contents are categorized on the basis of the setting information updated at Step S1330.

Figure 9:
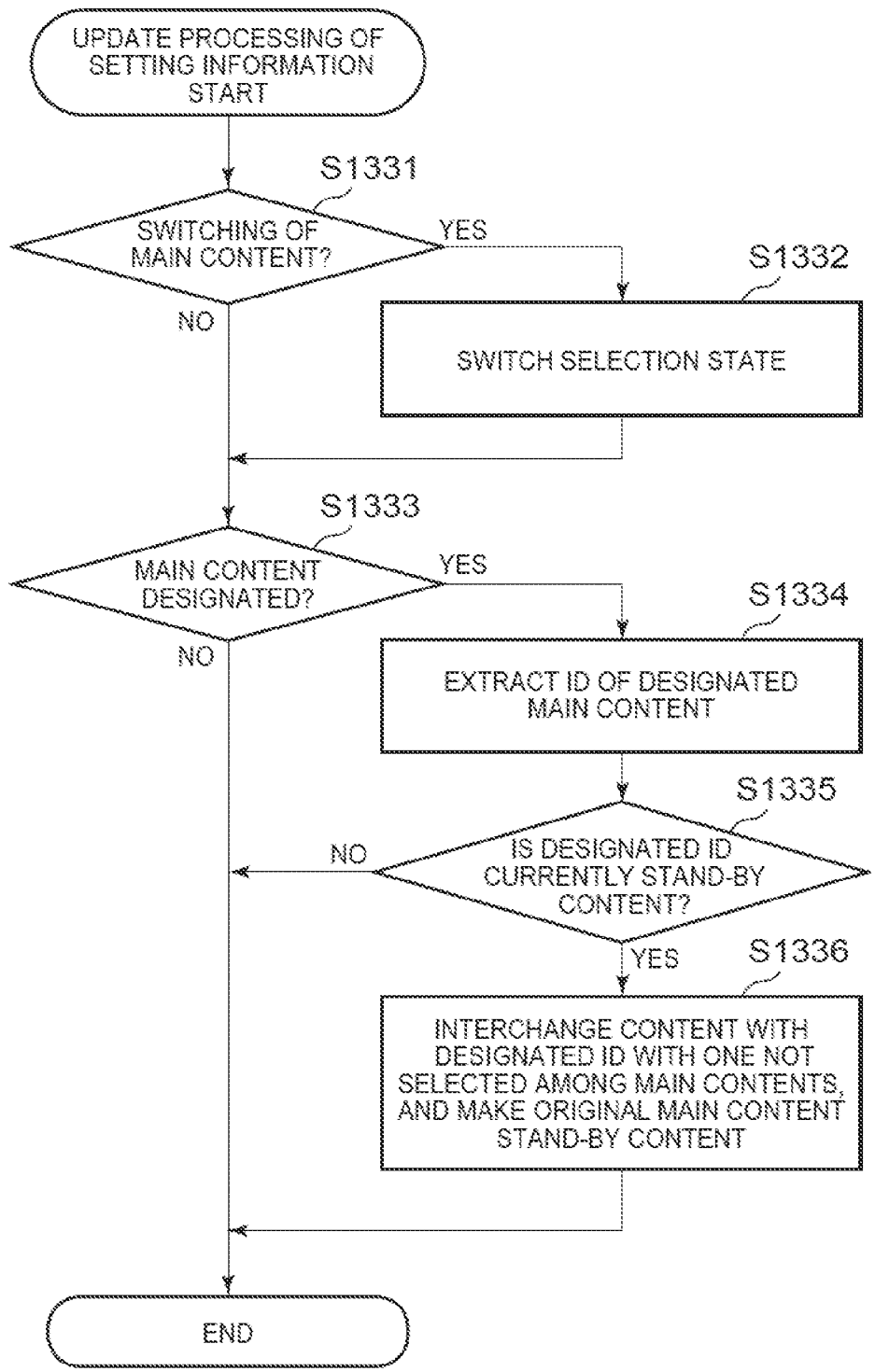
FIG. 9 is a flowchart showing exemplary updating processing of setting information by a content selection unit that a data transmission device in one embodiment of the present invention has.

Referring next to FIG. 9, the update processing of the setting information at Step S1330 shown in FIG. 8 is described in detail. FIG. 9 is a flowchart showing exemplary updating processing of the setting information by the content selection unit that the data transmission device in one embodiment of the present invention has.

As stated above, the update processing of the setting information is executed when the state notification information is supplied. The content selection unit 202 checks the contents of the state notification information, and when the state notification information is selection state notification information (i.e., information indicating switching between a broadcasting content and a switching content) (Step S1331), the content selection unit 202 updates the main content setting information 2022 so as to perform switching between the broadcasting content and the switching content (Step S1332).

For instance, the main content setting information 2022 manages main contents to add a selection state flag indicating a broadcasting content to one of the main contents so as to enable distinction of the broadcasting content. This selection state flag indicating the broadcasting content is reassigned to another main content (content that was managed as a switching content), whereby switching of the main contents at Step S1332 is performed. Herein, the state notification information may explicitly designate a content ID of the content to be the broadcasting content, to which the selection state flag is to be newly added, or a content to be the broadcasting content, to which the selection state flag is to be newly added, may be automatically set.

On the other hand, when the state notification information is main content selection information (i.e., information indicating switching between a stand-by content and a switching content) (Step S1333), the content selection unit 202 updates the main content setting information 2022 and the stand-by content setting information 2023 so as to perform switching between the stand-by content and the switching content. The main content selection information indicating switching between a stand-by content and a switching content contains a content ID of a content that is currently set as a stand-by content and is to be set as a switching content due to this notification. The content selection unit 202 extracts the content ID of the content to be set as the switching content from the state notification information (Step S1334), and when the content ID is included in the stand-by content setting information (Step S1335), the content selection unit 202 interchanges the stand-by content specified by the content ID with the switching content (Step S1336). That is, at Step S1336, the content selection unit 202 updates the setting information so as to register the content ID of the stand-by content designated by the state notification information in the main content setting information, delete the content ID of the content that is currently set as the switching content from the main content setting information, and at the same time delete the content ID of the stand-by content designated by the state notification information from the stand-by content setting information and register the content ID of the content that is currently set as the switching content in the stand-by content setting information. Herein, the state notification information may explicitly designate a content ID of the switching content to be an interchanging target with the stand-by content or a switching content to be an interchanging target with the stand-by content may be automatically set.

Figure 10:
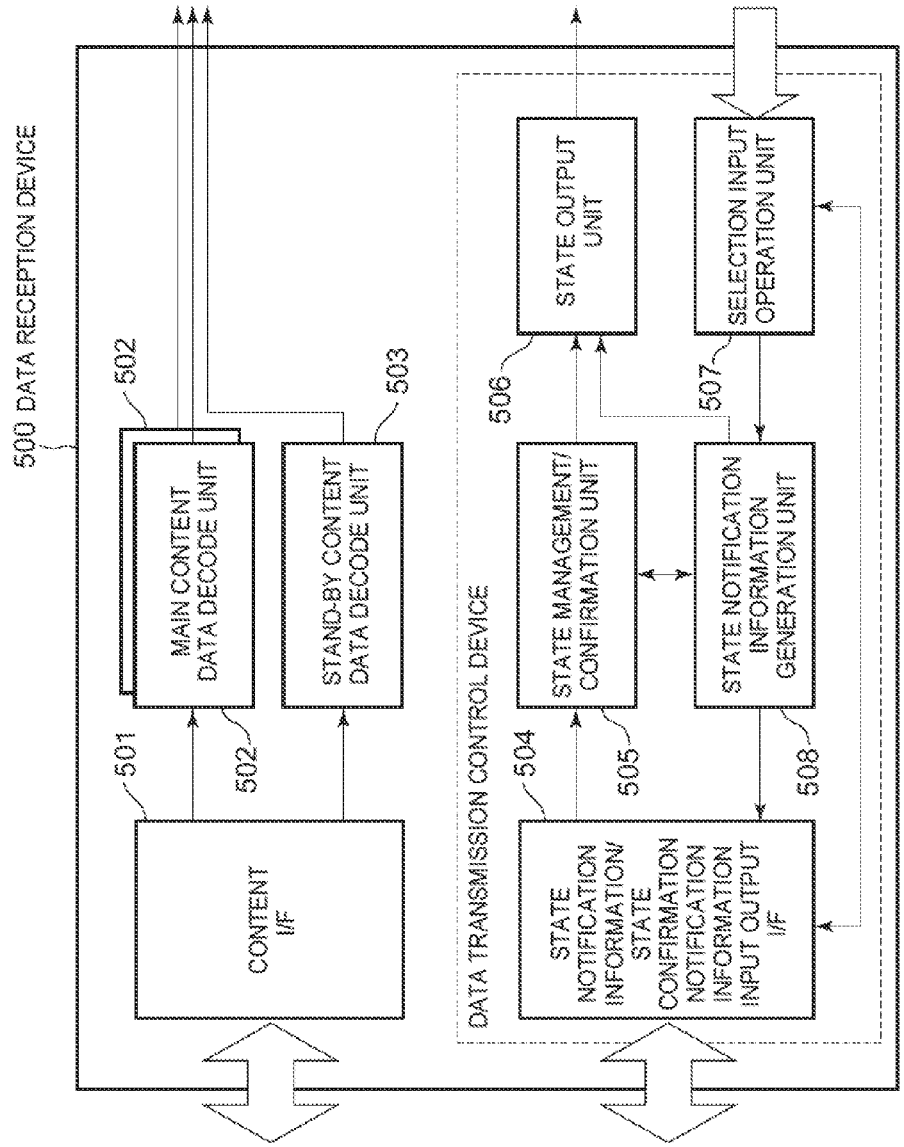
FIG. 10 is a block diagram showing an exemplary data reception device in one embodiment of the present invention.

Referring next to FIG. 10, the following describes an exemplary configuration of the data reception device 500 shown in FIG. 1. FIG. 10 is a block diagram showing an exemplary data reception device in one embodiment of the present invention. The data reception device 500 shown in FIG. 10 includes a content I/F (content interface) 501, a main content data decode unit 502, a stand-by content data decode unit 503, a state notification information/state confirmation notification information input output I/F (state notification information/state confirmation notification information input output interface) 504, a state management/confirmation unit 505, a state output unit 506, a selection input operation unit 507 and a state notification information generation unit 508.

The content I/F 501 is an interface to fetch content data (main content data and stand-by content data) transmitted from the data transmission device 200 into the data reception device 500. The main content data fetched by the content I/F 501 is supplied to the main content data decode unit 502, and the stand-by content data fetched by the content I/F 501 is supplied to the stand-by content data decode unit 503. Herein, the main content data is received from the data transmission device 200 via a main content line and the stand-by content data is received from the data transmission device 200 via a proxy data transmission line, and therefore it is easy for the data reception device 500 to discriminate the main content data and the stand-by content data, and as needed, discrimination between the main content data and the stand-by content data may be performed while referring to the state information stored in the state management/confirmation unit 505.

The main content data decode unit 502 has a function of decoding the main content data received from the data transmission device 200, and the stand-by content data decode unit 503 has a function of decoding the stand-by content data received from the data transmission device 200. The main content decoded by the main content data decode unit 502 and the stand-by content decoded by the stand-by content data decode unit 503 can be output to a switcher or a monitor, for example. The number of outputs from the stand-by content data decode unit 503 may vary depending of the display form of the stand-by contents (including plural outputs), but the drawing shows this with one line.

The state notification information/state confirmation notification information input output I/F (state notification information/state confirmation notification information input output interface) 504 is an interface to transmit state notification information to the data transmission device 200 and to receive state confirmation notification information from the data transmission device 200.

The state management/confirmation unit 505 has a function of managing a transmission state of contents, and has a function of holding a current transmission state of contents (video transmission state) as state information. The state information held by the state management/confirmation unit 505 may contain information indicating a setting state of each content (any one of a broadcasting content, a switching content and a stand-by content). The state management/confirmation unit 505 further has a function of referring to state confirmation notification information received from the data transmission device 200 to check whether setting at the data transmission device 200 is appropriate or not. Although state information held at the data reception device 500 and setting information held at the data transmission device 200 should be synchronized, if the checking of the state confirmation notification information results in out of synchronization therebetween, it is desirable to inform the data transmission device 200 of the state notification information again for synchronization.

The state output unit 506 has a function of outputting a current state at the data reception device 500 (state information held at the state management/confirmation unit 505), a current state at the data transmission device 200 (state confirmation notification information received from the data transmission device 200), state change notification contents generated at the state notification information generation unit 508 (state notification information) and the like so as to allow an operator of the data reception device 500 to check them, for example. The outputs from the state output unit 506 may be synthesized for outputting to a monitor, the state may be reported using a pilot lamp to an operator or the outputs may be supplied as a control signal to another control device.

The selection input operation unit 507 is an operation interface enabling an input by an operator of the data reception device 500 (e.g., an operation panel, a keyboard, a mouse or a communication interface with another device). The operator of the data reception device 500 can use the selection input operation unit 507 to input various settings and instructions such as an instruction to interchange a broadcasting content and a switching content and an instruction to interchange a switching content and a stand-by content. For instance, the operator can select a video being displayed as the stand-by content using an operation panel while viewing the video on the monitor and operate so as to prepare for high-quality transmission of the selected video as a content to be used next (that is, setting it as a switching content). Thereby, a series of operations relating to the notification of the main content selection information can be executed. Alternatively, an operation by the operator may not be input directly to the data reception device 500, and for example, another device performs switching of a broadcasting video (i.e., switching of the broadcasting content in the data reception device 500), whereby a signal indicating the switching is input to the selection input operation unit 507 as operation information. Thereby, a series of operations relating to the notification of the selection state can be executed.

The state notification information generation unit 508 has a function of generating state notification information to inform the data transmission device 200 of a state change on the basis of an input by the operator of the data reception device 500. The state notification information generation unit 508 further has a function of updating state information held at the state management/confirmation unit 505 on the basis of the input by the operator of the data reception device 500.

The data reception device 500 shown in FIG. 10 has two functions as a content reproduction device to receive and reproduce content data (including the content I/F (content interface) 501, the main content data decode unit 502 and the stand-by content data decode unit 503) and a data transmission control device to control a content transmission state at the data transmission device 200 (including the state notification information/state confirmation notification information input output I/F (state notification information/state confirmation notification information input output interface) 504, the state management/confirmation unit 505, the state output unit 506, the selection input operation unit 507 and the state notification information generation unit 508). These content reproduction device and data transmission control device may be implemented as different devices.

Figure 11:
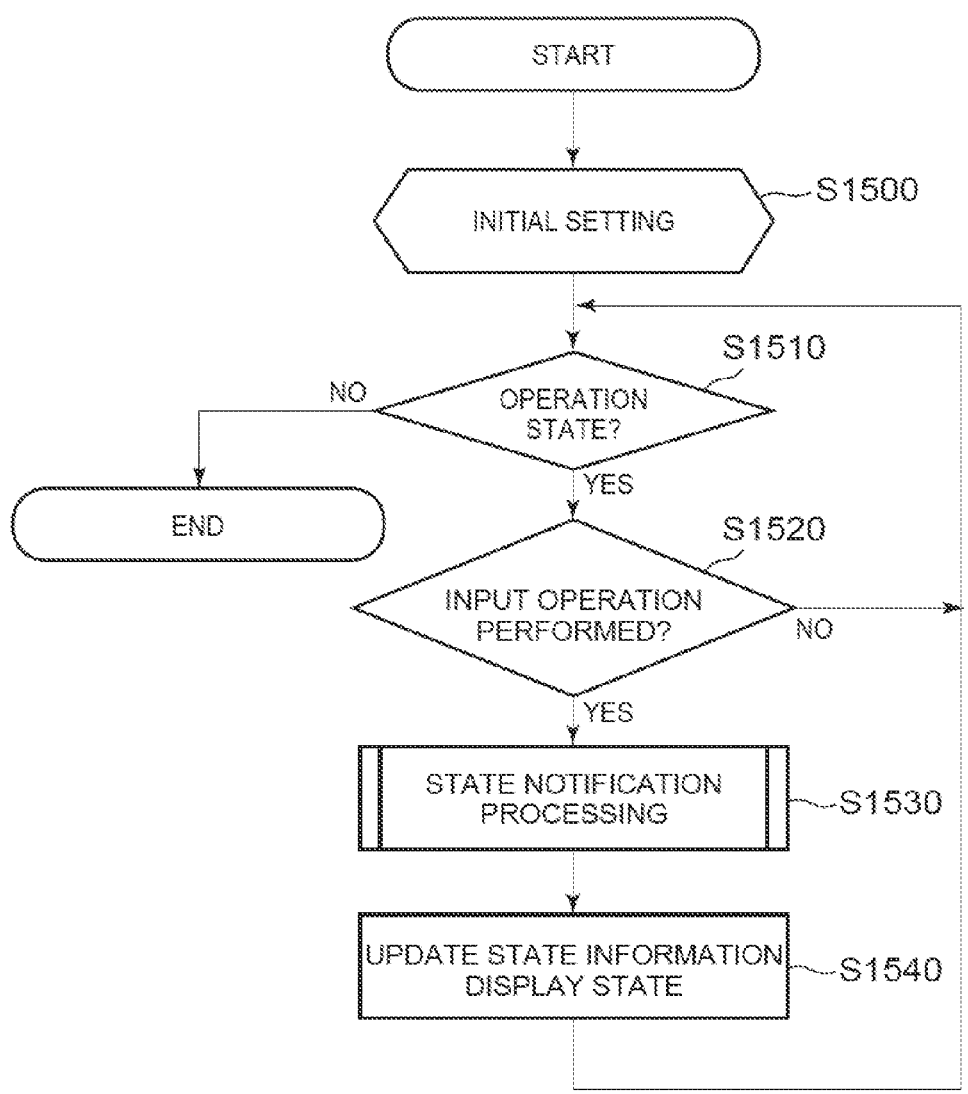
FIG. 11 is a flowchart showing exemplary generation/notification processing of state notification information at a state notification information generation unit that a data reception device in one embodiment of the present invention has.

Referring next to FIG. 11, the following describes generation/notification processing of state notification information at the state notification information generation unit 508 of the data reception device 500 shown in FIG. 10. FIG. 11 is a flowchart showing exemplary generation/notification processing of state notification information at the state notification information generation unit that the data reception device in one embodiment of the present invention has. Herein, the generation/notification processing of state notification information shown in FIG. 11 is performed in parallel with content reception and decode processing at the content I/F 501, the main content data decode unit 502 and the stand-by content data decode unit 503 of the data reception device 500 shown in FIG. 10.

In FIG. 11, firstly the state notification information generation unit 508 performs initial setting (Step S1500). This processing is advance preparation such as initial setting of state information held at the state management/confirmation unit 505 and generation and notification of state notification information to set the data transmission device 200 at the initial state.

Next, the state notification information generation unit 508 determines whether it is in an operation state where a content received from the data transmission device 200 undergoes content reproduction processing (Step S1510). Herein, the content reproduction processing is content reception and decode processing at the content I/F 501, the main content data decode unit 502 and the stand-by content data decode unit 503 of the data reception device 500 shown in FIG. 10.

When it is not an operation state of the content reproduction processing, since a content is not received or decoded, the generation/notification processing of state notification information ends. On the other hand, when it is an operation state of the content reproduction processing, determination is made whether the operator of the data reception device 500 performs an input operation or not (Step S1520). When the operator does not perform an input operation, the generation/notification processing of state notification information returns to Step S1510 to end the operation state or to enter a stand-by state until an input operation by the operator is performed. In this case, the state information held at the state management/confirmation unit 505 is not especially changed, that is, settings of the broadcasting content, the switching contents and the stand-by contents are not changed but maintained.

On the other hand, when the operator performs an input operation, the state notification information generation unit 508 performs state notification processing (Step S1530). In the state notification processing at Step S1530, state notification information to report a state change is generated on the basis of the contents of the operator's input operation, and is transmitted to the data transmission device 200. The details of the state notification processing at Step S 1530 are described later, with reference to FIG. 12.

Concurrently with the notification/transmission processing of the state notification information at Step S1530, the state notification information generation unit 508 updates the state information held at the state management/confirmation unit 505 on the basis of the contents of the operator's input operation (Step S1540). Herein, at this time, updating of the state information, the updated contents (e.g., including an ID of the camera 100 shooting the updated contents) and the like may be output from the state output unit 506. Then, the generation/notification processing of state notification information returns to Step S1510 to end the operation state or to enter a stand-by state until the state notification information is supplied. In this case, the data transmission device 200 receiving the notification of the state notification information updates the setting information on the basis of the notification information reported at Step S1530, and contents are categorized and transmitted on the basis of the updated setting information.

Figure 12:
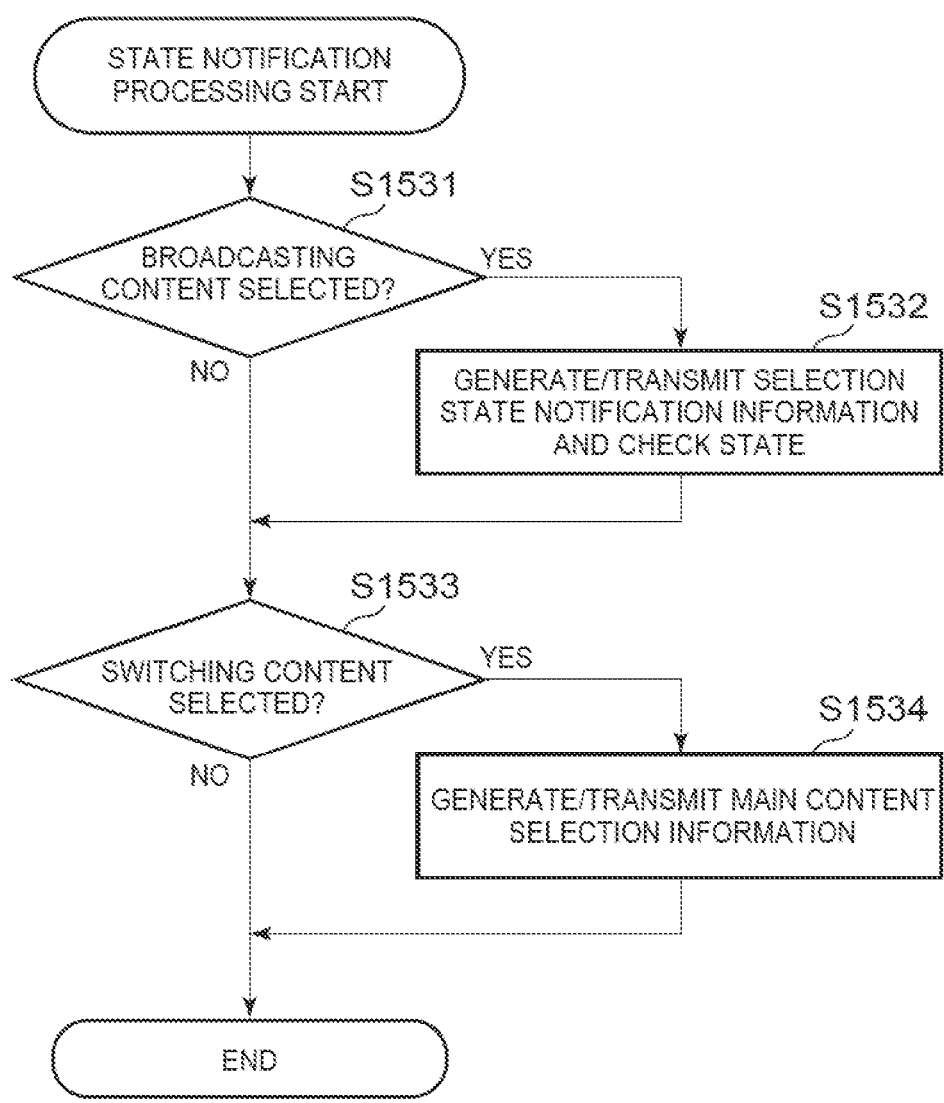
FIG. 12 is a flowchart showing exemplary state notification processing of a state notification information generation unit that a data reception device in one embodiment of the present invention has.

Referring next to FIG. 12, the following describes the details of the state notification processing at Step S1530 shown in FIG. 11. FIG. 12 is a flowchart showing exemplary state notification processing of the state notification information generation unit that the data reception device in one embodiment of the present invention has.

As stated above, the state notification processing is executed when the operator performs an input operation. The state notification information generation unit 508 checks the contents of the input operation by the operator, and when the contents of the input operation by the operator indicate switching between a broadcasting content and a switching content (Step S1531), the state notification information generation unit 508 generates state notification information (selection state notification information) indicating the switching between a broadcasting content and a switching content, and transmits the same to the data transmission device 200 (Step S1532). In this case, a selection state flag is just replaced in the main content setting information at the data transmission device 200, and a video transmission state from the data transmission device 200 is not changed. Therefore, it is desirable to refer to the state confirmation notification information transmitted from the data transmission device 200 so as to check whether setting change is performed at the data transmission device 200 or not.

When the contents of the operator's input operation indicates switching between a switching content and a stand-by content (Step S1533), state notification information (main content selection information) indicating switching between a switching content and a stand-by content is generated and is transmitted to the data transmission device 200 (Step S1534). In this case, when setting information is updated at the data transmission device 200 on the basis of the state notification information, the video transmission state from the data transmission device 200 is changed.

As shown in FIGS. 3A to 3D, for example, the above description assumes the case of only one switching content set. As shown in FIG. 13, however, any number (m pieces) of switching contents may be set.

When a plurality of (two or more) switching contents exist, unlike the case of the presence of only one switching content, there are a plurality of switching contents as an interchanging target with the stand-by content to select the switching content, and there are a plurality of switching contents as an interchanging target with the broadcasting content to select the broadcasting content. As described clearly in the above description, however, the state notification information may explicitly designate a content ID of the switching content as an interchanging target with the stand-by content or the broadcasting content, or a switching content as an interchanging target with the stand-by content or the broadcasting content may be automatically set. In the case of automatically setting, various conditions may be considered, such as history of contents interchanging and priority of contents (e.g., priority of cameras). For instance, it is desirable that a condition may be set so that a switching content that was the broadcasting content immediately before (i.e., by referring to history of contents interchanging, finding the switching content that was interchanged most recently with the broadcasting content) was excluded from the next interchanging target with the stand-by content, or contents at angles that are frequently switched for broadcasting may be locked to main contents, and such contents are not set at an interchanging target with the stand-by content.

As described above, according to the present invention, all of the followings can be achieved:

(1) when a large number of contents are supplied from a content transmission side, these large number of contents can be checked by a content reception side;

(2) under a situation securing minimum QoS (or under a situation where only limited minimum QoS can be secured), a plurality of contents can be effectively transmitted (only (1+m) pieces of main content lines may be prepared to transmit main contents); and (3) the device configuration on the content transmission side is simplified, and contents selected on the content reception side can be used for broadcasting immediately (moreover, the necessity of human operations to select contents can be eliminated on the content transmission side). Further, a switching content provided, which is transmitted via a main content line, can be used as a content to be switched as the broadcasting content of the next scene, whereby a content of the next scene can be stably transmitted and smooth switching of the broadcasting content is enabled.

According to the present invention, at least one or more stand-by contents provided enable a reduction in the number of lines for which high QoS is to be secured to transmit data having a broadcasting content quality. That is, in the present invention, in order to obtain the aforementioned effects, at least one or more stand-by contents has to be provided, and any number of switching contents may be provided.

Figure 14:
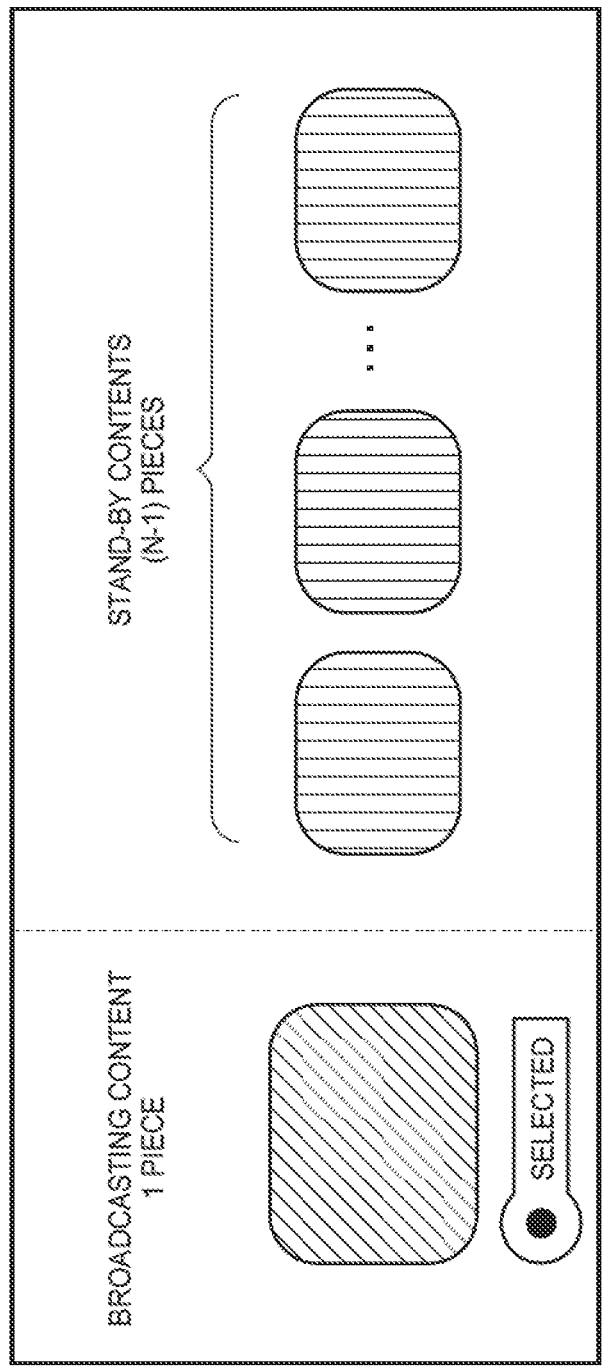
FIG. 14 schematically shows a sixth exemplary video transmission state (when switching contents are not set) in one embodiment of the present invention.
Figure 15:
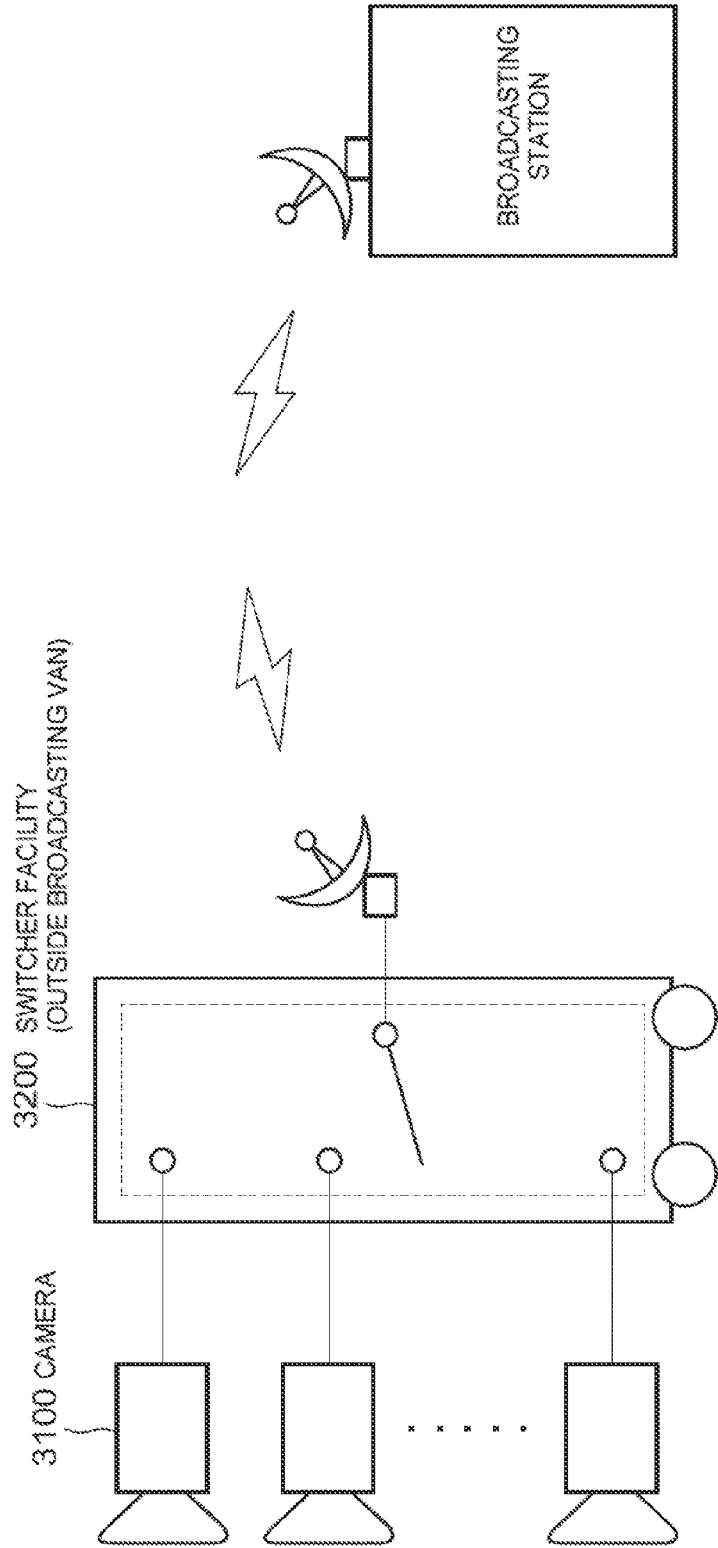
FIG. 15 shows an exemplary system configuration in prior art.
Figure 16:
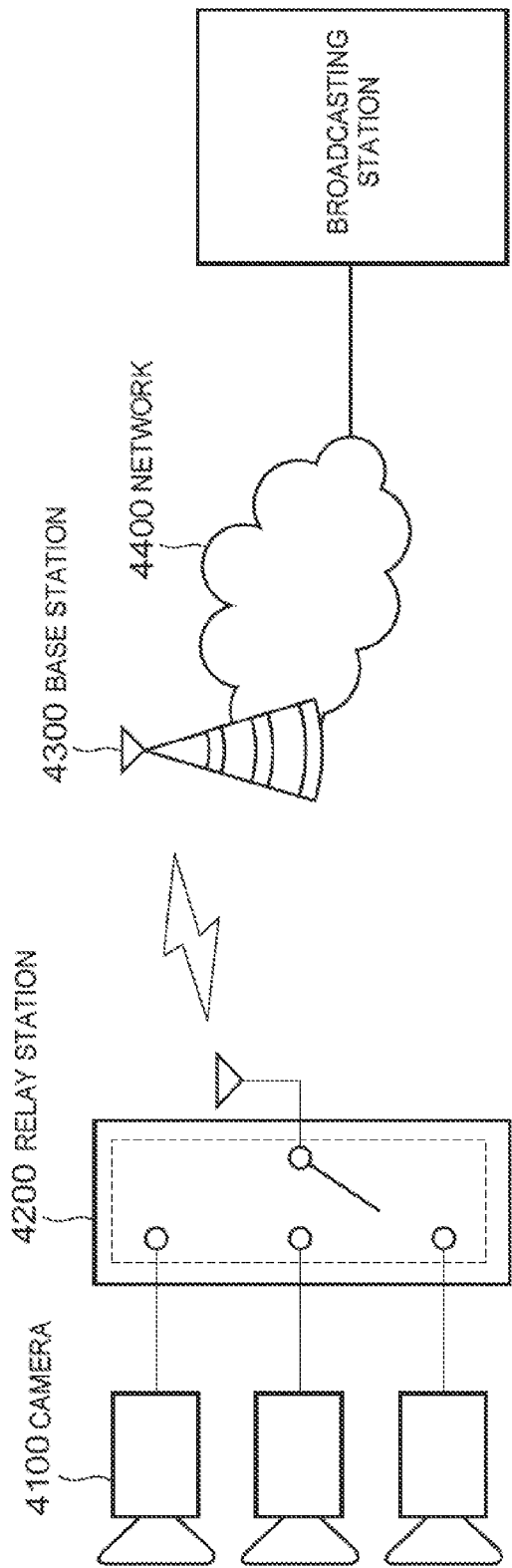
FIG. 16 shows a first exemplary system configuration to describe the problems to be solved by the present invention.
Figure 17:
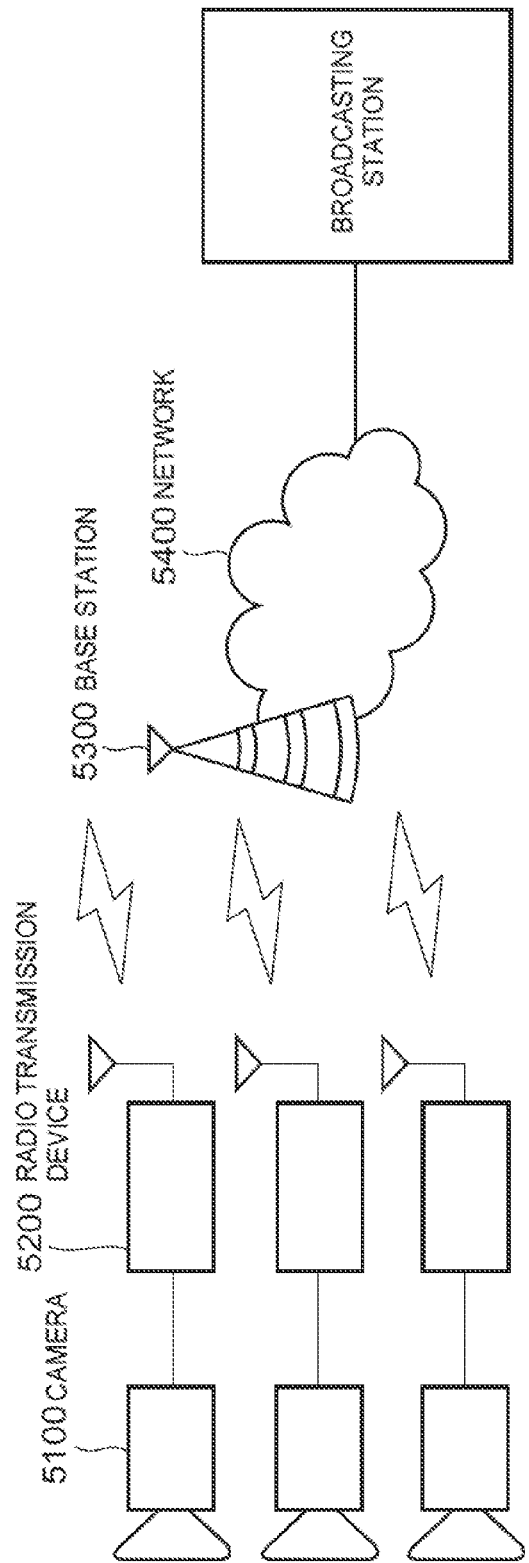
FIG. 17 shows a second exemplary system configuration to describe the problems to be solved by the present invention.

The above description mainly deals with the case of providing one or more switching contents (two or more main contents provided). Instead, in the present invention, no switching content may be provided (i.e., only one main content provided). In this case, as shown in FIG. 14, among N pieces of contents, only one broadcasting content (only one main content) is set, and the remaining (N−1) contents are set as stand-by contents. Therefore, one main content line is required between the data transmission device 200 and the data reception device 500 to transmit the broadcasting content, and proxy data transmission lines are required to transmit the remaining (N−1) stand-by contents.

There are two ways of changing contents when a switching content exists. In the case of absence of a switching content, however, the way is limited to a changing method of interchanging a stand-by content and a broadcasting content. That is, when a content from a camera 100 that is to be used as the next scene is selected among stand-by contents, the selected stand-by content is set as the broadcasting content, and the content that was the broadcasting content until now is set as a stand-by content.

The other operations for the case of absence of a switching content can be basically understood based on the configuration and the operation in the case of presence of a switching content by omitting the configuration and the operation relating to a switching content or by replacing the switching content with the broadcasting content for reading.

According to the present invention, even in the case of absence of a switching content (i.e., only one main content exists), all of the followings can be achieved:

(1) when a large number of contents are supplied from a content transmission side, these large number of contents can be checked by a content reception side;

(2) under a situation securing minimum QoS (or under a situation where only limited minimum QoS can be secured), a plurality of contents can be effectively transmitted (only one main content line may be prepared to transmit the main content); and (3) the device configuration on the content transmission side is simplified, and contents selected on the content reception side can be used for broadcasting immediately (moreover, the necessity of human operations to select contents can be eliminated on the content transmission side).

The above description deals with the case of providing one broadcasting content. Instead, in the present invention, a plurality of broadcasting contents may be provided (i.e., among main contents, a plurality of contents is handled distinctively from switching contents). In this case, among N pieces of contents, m (or 0) pieces of switching contents and k pieces (k≥2) of broadcasting contents are provided, and the remaining (N−m−k) pieces of contents are set as stand-by contents. Therefore, between the data transmission device 200 and the data reception device 500, (m+k) main content lines are required to transmit the broadcasting contents and the switching contents, and proxy data transmission lines are required to transmit the remaining (N−m−k) stand-by contents.

In this case, information (one selection state flag) indicating the broadcasting content, which is set for the case of only one broadcasting content existing, corresponding to the broadcasting contents in number, i.e., k pieces (or k types of) of the information may be prepared. That is, when a content from a camera 100 to be used as a scene for broadcasting is selected among main contents, the selected main content is set as the broadcasting content, and the content that was the broadcasting content until now is set as a switching content. Such a mode may be used to configure rich contents from a plurality of view points (multi-angle) for the broadcasting contents (programs and the like). When broadcasting from a plurality of view pointes is simply performed, k selection state flags may be prepared, and when broadcasting is performed while distinguishing the individual view points (in the case where each angle is set as ∘∘ angle, and audience follows the predetermined angle for a predetermined time), k types of selection state flags (mutually distinguishable k pieces) may be prepared.

The other operations for the case of presence of k pieces of broadcasting contents can be basically understood based on the configuration and the operation in the case of the presence of one broadcasting content by providing a plurality of outputs for the broadcasting contents so as to deal with a plurality of pieces of information indicating broadcasting contents.

According to the present invention, even in the case of the presence of k pieces of broadcasting contents, all of the followings can be achieved:

(1) when a large number of contents are supplied from a content transmission side, these large number of contents can be checked by a content reception side;

(2) under a situation securing minimum QoS for under a situation where only limited minimum QoS can be secured), a plurality of contents can be effectively transmitted (only (m+k) main content lines may be prepared to transmit the main contents); and (3) the device configuration on the content transmission side is simplified, and contents selected on the content reception side can be used for broadcasting immediately (moreover, the necessity of human operations to select contents can be eliminated on the content transmission side).

Embodiments described in the present specification assume the case where a switching content and a broadcasting content are selected in accordance with an input of an operator of the data reception device 500. However, a switching content and a broadcasting content may be selected in accordance with a predetermined schedule (sequence). For instance, when a switching sequence of contents is predetermined, a content to be used for the next scene (a content to be upgraded next to the broadcasting content) may be set as a switching content beforehand, and simply by replacing a selection state flag at a desired timing, contents can be switched smoothly and immediately.

When an operation interface of the selection input operation unit 507 is a communication interface with another device, a switching device may exist at a higher rank than a content to be used for broadcasting. For instance, in a possible case, the data reception device 500 simply selects a relayed content from the data transmission device 200, and further switches it with contents from a studio where the data reception device 500 is placed or another relay facility to select the final broadcasting content. In this case, the broadcasting content referred to in embodiments described in the present specification, aside from the literal meaning, can be dealt with as a content in a selected state at the data reception device 500 (regardless of being broadcasted actually, a content in a selected state that is distinguished from other contents). That is, when any content received at the data reception device 500 is not used for broadcasting, similarly to the initial state before broadcasting or the like, the broadcasting content in the data reception device 500 is in a state of being selected as the broadcasting content in the data reception device 500. Herein, desirably it is configured to, through the selection input operation unit 507, allow the state of contents other than the data reception device 500 being broadcasted or no contents being broadcasted (in a rehearsal state) to be acquired so as to reflect the same to a state display or to inform the data transmission device 200 as one type of the state information.

Herein, in the present embodiment, the case where a broadcasting content is not actually broadcasted refers to the state where a content dealt by the data reception device 500 and the data transmission device 200 is not broadcasted as follows:

immediately after activation of the data reception device or the data transmission device;
during rehearsal;
before a take after rehearsal;
during televising of videos at another broadcast spot; and
during televising of videos in a studio.

Embodiments described in the present specification assume the case where the data transmission device 200 and the base station 300 are connected via radio communications and the network 400 is a public circuit network. However, as long as videos can be transmitted from the data transmission device 200 to the data reception device 500 and state notification information can be reported from the data reception device 500 to the data transmission device 200, any connection form between the data transmission device 200 and the data reception device 500 may be used, including wired or wireless. For instance, videos may be transmitted from the data transmission device 200 to the data reception device 500 using SNG or a FPU. State notification information may be reported from the data reception device 500 to the data transmission device 200 via a predetermined dedicated line. Further, the aforementioned embodiments assume that the data transmission device 200 is placed at a broadcast spot and the data reception device 500 is placed at a broadcasting station. However, as long as the data transmission device 200 can transmit a plurality of contents and the data reception device 500 can receive a plurality of contents, any arrangement can be used. For instance, they may be as a domestic AV system, and in a domestic audio visual system made up of a reproduction device capable of simultaneously reproducing a plurality of multimedia contents and a display device capable of simultaneously displaying these plurality of multimedia contents, the data transmission device 200 may be placed as the reproduction device and the data reception device 500 may be placed as the display device.

The present invention can provide the following data transmission device as well.

That is, a data transmission device transmits a plurality of contents to a data reception device and includes:

a setting information holding unit that holds setting information that sets at least one or more contents among the plurality of contents as main contents and at least one or more contents among the plurality of contents as stand-by contents, and indicates each of the plurality of contents as any one of the main contents and the stand-by contents;

a content selection unit that categorizes each of the plurality of contents into any one of the main contents and the stand-by contents on a basis of the setting information held at the setting information holding unit;

a main content transmission unit that transmits a content determined as the main contents by the content selection unit via a high-quality line to the data reception device; and a stand-by content transmission unit that transmits a content determined as the stand-by contents by the contents selection unit via a line of a quality lower than the high-quality line to the data reception device.

The present invention can provide the following data transmission device as well.

That is, a data transmission device transmits a plurality of contents to a data reception device and includes:

a setting information holding unit that holds setting information that sets one content among the plurality of contents as a main content and remaining contents other than the main content among the plurality of contents as stand-by contents, and indicates each of the plurality of contents as any one of the main content and the stand-by contents;

a content selection unit that categorizes each of the plurality of contents into any one of the main content and the stand-by contents on a basis of the setting information held at the setting information holding unit;

a main content transmission unit that transmits a content determined as the main content by the content selection unit via a high-quality line to the data reception device; and a stand-by content transmission unit that transmits a content determined as the stand-by contents by the contents selection unit via a line of a quality lower than the high-quality line to the data reception device.

The present invention can provide the following data transmission control device as well.

That is, a data transmission control device controls data transmission by a data transmission device. The data transmission device for transmitting a plurality of contents to a data reception device includes: a setting information holding unit that holds predetermined setting information; a content selection unit that categorizes each of the plurality of contents into any one of a main content and a stand-by content on a basis of the predetermined setting information held at the setting information holding unit; a main content transmission unit that transmits a content determined as the main content by the content selection unit via a high-quality line to the data reception device; and a stand-by content transmission unit that transmits a content determined as the stand-by content by the content selection unit via a line of a quality lower than the high-quality line to the data reception device. The data transmission control device includes a reporting unit that reports, to the data transmission device, the predetermined setting information that sets at least one or more contents among the plurality of contents as the main contents and at least one or more contents among the plurality of contents as the stand-by contents, and indicates each of the plurality of contents as any one of the main contents and the stand-by contents.

The present invention can provide the following data transmission control device as well.

A data transmission control device controls data transmission by a data transmission device. The data transmission device for transmitting a plurality of contents to a data reception device includes: a setting information holding unit that holds predetermined setting information; a content selection unit that categorizes each of the plurality of contents into any one of a main content and a stand-by content on a basis of the predetermined setting information held at the setting information holding unit; a main content transmission unit that transmits a content determined as the main content by the content selection unit via a high-quality line to the data reception device; and a stand-by content transmission unit that transmits a content determined as the stand-by content by the content selection unit via a line of a quality lower than the high-quality line to the data reception device. The data transmission control device includes a reporting unit that reports, to the data transmission device, the predetermined setting information that sets at least one content among the plurality of contents as the main contents and remaining contents other than the main contents among the plurality of contents as the stand-by contents, and indicates each of the plurality of contents as any one of the main contents and the stand-by contents.

A functional block used in the description of the above-stated embodiments may be typically implemented as a LSI (Large Scale Integration) that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration.

A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used.

Further, if a technique for integrated circuit that replaces LSIs becomes available with the development of a semiconductor technique or derived techniques, functional blocks may be naturally integrated using such a technique. For instance, biotechnology may be applied thereto.

Industrial Applicability

The present invention has the advantageous effect of configuring a new data transmission system capable of achieving all of the followings and is applicable to a data transmission technique to transmit contents:

(1) when a large number of contents are supplied from a content transmission side, these large number of contents can be checked by a content reception side;

(2) under a situation securing minimum QoS (or under a situation where only limited minimum QoS can be secured), a plurality of contents can be effectively transmitted; and (3) the device configuration on the content transmission side is simplified, and contents selected on the content reception side can be used for broadcasting with a small time lag.

The invention claimed is:

1. A data transmission device that transmits a plurality of contents to a data reception device, comprising:
   a setting information holding unit that holds setting information indicating each of the plurality of contents as a main content or a stand-by content, at least two or more contents among the plurality of contents being set as the main contents and a remaining content other than the main contents among the plurality of contents being set as a stand-by content, wherein at least one main content of the two or more main contents is set as a broadcasting content and a remaining main content other than the broadcasting content among the two or more main contents is set as a switching content, and each of the two or more main contents is managed as the broadcasting content or the switching content;
   a content selection unit that categorizes each of the plurality of contents into the main content or the stand-by content on a basis of the setting information held at the setting information holding unit;
   a main content transmission unit that transmits a content determined as the main content by the content selection unit via a high-quality line to the data reception device; and
   a stand-by content transmission unit that transmits a content determined as the stand-by content by the contents selection unit via a line of a quality lower than the high-quality line to the data reception device, wherein the data transmission device is placed at a broadcast spot and the data reception device is placed at a broadcasting station;
   a main content selection information reception unit that receives, from a data transmission control device, main content selection information including an instruction to interchange a specific stand-by content and the switching content; and
   a setting information update unit that updates the setting information held at the setting information holding unit on a basis of the main content selection information received by the main content selection information reception unit so that any one of the switching content is set as the stand-by content and the specific stand-by content is set as the switching content,
   wherein the setting information update unit decides the switching content to be interchanged with the specific stand-by content on a basis of a predetermined condition,
   wherein the setting information update unit manages history of contents interchanging, and excludes a switching content that was a broadcasting content immediately before from an interchanging target with the specific stand-by target, and
   wherein the setting information update unit refers to a lock setting condition set beforehand and excludes a specific main content that is locked by the lock setting condition from an interchanging target with the specific stand-by content.

2. The data transmission device according to claim 1, wherein
   in the setting information, a plurality of main contents of the two or more main contents are set as broadcasting contents and a remaining main content other than the broadcasting contents among the two or more main contents is set as a switching content, and
   each of the two or more main contents is managed as the broadcasting content or the switching content.

3. The data transmission device according to claim 1, wherein the main content selection information includes identification information on the switching content that is to be interchanged with the specific stand-by content.

4. The data transmission device according to claim 1 or 2, further comprising:
   a selection state notification information reception unit that receives, from a data transmission control device, selection state notification information including an instruction to interchange a specific switching content and the broadcasting content; and
   a setting information update unit that updates the setting information held at the setting information holding unit on a basis of the selection state notification information received by the selection state notification information reception unit so that the broadcasting content is set as the switching content and the specific switching content is set as the broadcasting content.

5. The data transmission device according to claim 4, wherein the setting information includes flag information added to the main content set as the broadcasting content, the flag information indicating that the content is the broadcasting content, and the setting information update unit reassigns the flag information from the main content set as the broadcasting content to the specific switching content in the setting information.

6. The data transmission device according to claim 4, wherein the setting information includes flag information added to each of the plurality of main contents set as the broadcasting contents, the flag information indicating that the content is the broadcasting content, and the setting information update unit reassigns flag information that is added to a specific main content set as the broadcasting content from the specific main content set as the broadcasting content to the specific switching content in the setting information.

7. The data transmission device according to claim 4, wherein the setting information includes different types of flag information each added to one of the plurality of main contents set as the broadcasting contents, the flag information indicating that the content is the broadcasting content, and the setting information update unit reassigns the flag information that is added to a specific main content set as the broadcasting content from the specific main content set as the broadcasting content to the specific switching content in the setting information.

8. The data transmission device according to claim 1, further comprising a state confirmation notification information reporting unit that reports state confirmation notification information including contents of the setting information to a data transmission control device.

9. The data transmission device according to claim 1, further comprising a stand-by content processing unit that, when a plurality of stand-by contents exist, uses screen splitting display to process the plurality of stand-by contents to be collected into one screen.

10. The data transmission device according to claim 1, wherein the plurality of contents are each managed by an identifier in the setting information, wherein
the data transmission device further comprises an identifier setting unit that, when there is a content that is not registered in the setting information, assigns a new identifier to the content not registered in the setting information, and reports the new identifier to the data reception device.

11. A data transmission control device that controls data transmission by a data transmission device, the data transmission device for transmitting a plurality of contents to a data reception device, and the data transmission device including: a setting information holding unit that holds predetermined setting information; a content selection unit that categorizes each of the plurality of contents into a main content or a stand-by content on a basis of the predetermined setting information held at the setting information holding unit; a main content transmission unit that transmits a content determined as the main content by the content selection unit via a high-quality line to the data reception device; and a stand-by content transmission unit that transmits a content determined as the stand-by content by the content selection unit via a line of a quality lower than the high-quality line to the data reception device,
the data transmission control device comprising:
a reporting unit that reports, to the data transmission device, the predetermined setting information indicating each of the plurality of contents as the main content or the stand-by content, at least two or more contents among the plurality of contents being set as the main contents and a remaining content other than the main contents among the plurality of contents being set as the stand-by content, wherein the data transmission device is placed at a broadcast spot and the data reception device is placed at a broadcasting station and at least one main content of the two or more main contents is set as a broadcasting content and a remaining main content other than the broadcasting content among the two or more main contents is set as a switching content, and each of the two or more main contents is managed as the broadcasting content or the switching content;
a main content selection information generation unit that generates main content selection information including an instruction to interchange the specific stand-by content and the switching content, in order to allow the data transmission device to update the predetermined setting information so that any one of the switching content is set as the stand-by content and a specific stand-by content is set as the switching content, wherein the main content selection information generation unit decides the switching content that is to be interchanged with the specific stand-by content on a basis of a predetermined condition; and
a main content selection information reporting unit that reports the main content selection information generated by the main content selection information generation unit to the data transmission device,
wherein the setting information update unit manages history of contents interchanging, and excludes a switching content that was a broadcasting content immediately before from an interchanging target with the specific stand-by content and
wherein the setting information update unit refers to a lock setting condition set beforehand and excludes a specific main content that is locked by the lock setting condition from an interchanging target with the specific stand-by content.

12. The data transmission control device according to claim 11, wherein
in the setting information, a plurality of main contents of the two or more main contents are set as broadcasting contents and a remaining main content other than the broadcasting contents among the two or more main contents is set as a switching content, and
each of the two or more main contents is managed as the broadcasting content or the switching content.

13. The data transmission control device according to claim 11, wherein the main content selection information generation unit inserts identification information on the switching content that is to be interchanged with the specific stand-by content into the main content selection information.

14. The data transmission control device according to claim 11, further comprising an input interface that receives an input signal from outside, wherein
the main content selection information generation unit generates the main content selection information on a basis of the input signal received by the input interface.

15. The data transmission control device according to claim 11 or 12, further comprising:
a selection state notification information generation unit that generates selection state notification information including an instruction to interchange the specific switching content and the broadcasting content, in order to allow the data transmission device to update the predetermined setting information so that the broadcasting content is set as the switching content and a specific switching content is set as the broadcasting content; and
a selection state notification information reporting unit that reports the selection state notification information generated by the selection state notification information generation unit to the data transmission device.

16. The data transmission control device according to claim 15, further comprising: an input interface that receives an input signal from outside, wherein
the selection state notification information generation unit generates the selection state notification information on a basis of the input signal received by the input interface.

17. The data transmission control device according to claim 11, further comprising:
- a state information holding unit that holds state information indicating a data transmission control state of the data transmission device;
- a state confirmation notification information reception unit that receives, from the data transmission device, state confirmation notification information including contents of the predetermined setting information held at the data transmission device; and
- a state check unit that checks whether a data transmission control state in the data transmission device is appropriate or not on a basis of the state information held at the state information holding unit and the state confirmation notification information received by the state confirmation notification information reception unit.

18. The data transmission control device according to claim 11 or 12, further comprising a broadcasting state reporting unit that reports, to the data transmission device, when the broadcasting content is not broadcasted actually, a state where the broadcasting content is not broadcasted actually.

* * * * *